(12) United States Patent
Breuer et al.

(10) Patent No.: US 10,187,163 B2
(45) Date of Patent: Jan. 22, 2019

(54) SELF-LOCATING LIGHT-BASED COMMUNICATION ENABLED LUMINAIRES

(71) Applicants: Christian Breuer, Dortmund (DE); Carsten Vogt, Munich (DE); Anant Aggarwal, Waltham, MA (US); Barry Stout, Beverly, MA (US)

(72) Inventors: Christian Breuer, Dortmund (DE); Carsten Vogt, Munich (DE); Anant Aggarwal, Waltham, MA (US); Barry Stout, Beverly, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 15/450,071

(22) Filed: Mar. 6, 2017

(65) Prior Publication Data

US 2018/0254835 A1 Sep. 6, 2018

(51) Int. Cl.
*H04B 10/116* (2013.01)
*H04B 10/80* (2013.01)
(Continued)

(52) U.S. Cl.
CPC ........... *H04B 10/80* (2013.01); *H04B 10/116* (2013.01); *H05B 37/0245* (2013.01); *H05B 33/0842* (2013.01)

(58) Field of Classification Search
CPC ..... H04B 10/116; H04B 10/80; H04W 4/001; H04W 4/008; H04W 4/021;
(Continued)

(56) References Cited

U.S. PATENT DOCUMENTS 9,437,086 B2 * 9/2016 Loveland ........... H05B 37/0272
2013/0211715 A1 * 8/2013 Bae .......................... G01S 19/48
701/469

(Continued)

FOREIGN PATENT DOCUMENTS

WO 2015148562 A1 10/2015

OTHER PUBLICATIONS

Petitit, Nicolas, International Search Report and Written Opinion of the International Searching Authority, for counterpart application PCT/US2018/017320, dated May 4, 2018, European Patent Office, Rijswijk, The Netherlands, 12 pages.

*Primary Examiner* — Don N Vo
(74) *Attorney, Agent, or Firm* — Yutian Ling

(57) ABSTRACT

Techniques are disclosed for programming a luminaire position for light-based communication (LCom) luminaires within an array of luminaires using position information provided by passing mobile computing devices. This position information can be received as, for example, as a specific coordinate (e.g., x-y coordinates of a grid-based map) or as movement data of the mobile computing device relative to an initial known reference location. The disclosed techniques can be used, for example, to reduce the time, labor, and expense associated with programming and re-programming a luminaire with a luminaire position, and to increase the flexibility of navigation system installations. In some cases, the disclosed techniques can be used, for example, to improve the precision of a luminaire position programmed into a newly installed luminaire.

20 Claims, 11 Drawing Sheets

(51) Int. Cl.
*H05B 37/02* (2006.01)
*H05B 33/08* (2006.01)

(58) Field of Classification Search
CPC ......... H04L 2012/2841; H04L 12/2803; H04L 12/282; G01S 17/48; H05B 37/0245; H05B 33/0842
USPC .......................................................... 398/25
See application file for complete search history.

(56) References Cited

U.S. PATENT DOCUMENTS

| | | | |
|---|---|---|---|
| 2015/0098709 A1* | 4/2015 | Breuer | G01C 3/08 |
| | | | 398/118 |
| 2015/0256963 A1* | 9/2015 | Dahlen | H04W 4/80 |
| | | | 455/41.2 |
| 2016/0150369 A1* | 5/2016 | Reed | H04W 4/021 |
| | | | 455/456.1 |
| 2016/0249164 A1* | 8/2016 | Jovicic | H04W 4/023 |
| 2016/0345414 A1* | 11/2016 | Nolan | G08C 17/02 |
| 2017/0048952 A1* | 2/2017 | Roberts | H05B 37/0272 |
| 2017/0160371 A1* | 6/2017 | Bockle | G01J 1/42 |
| 2017/0164439 A1* | 6/2017 | Reed | H05B 33/0827 |

* cited by examiner

SELF-LOCATING LIGHT-BASED COMMUNICATION ENABLED LUMINAIRES

TECHNICAL FIELD

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, satellite-based navigation can be supplemented using local area wireless technologies, such as Wi-Fi, which utilizes radio frequency (RF) signals to communicate with nearby compatible devices. These types of wireless technologies typically employ wireless access points (Wi-Fi hotspots) to establish network access. In cases of secured wireless networks, a password or other security credentials normally must be provided in order to gain network access.

Figure 1:
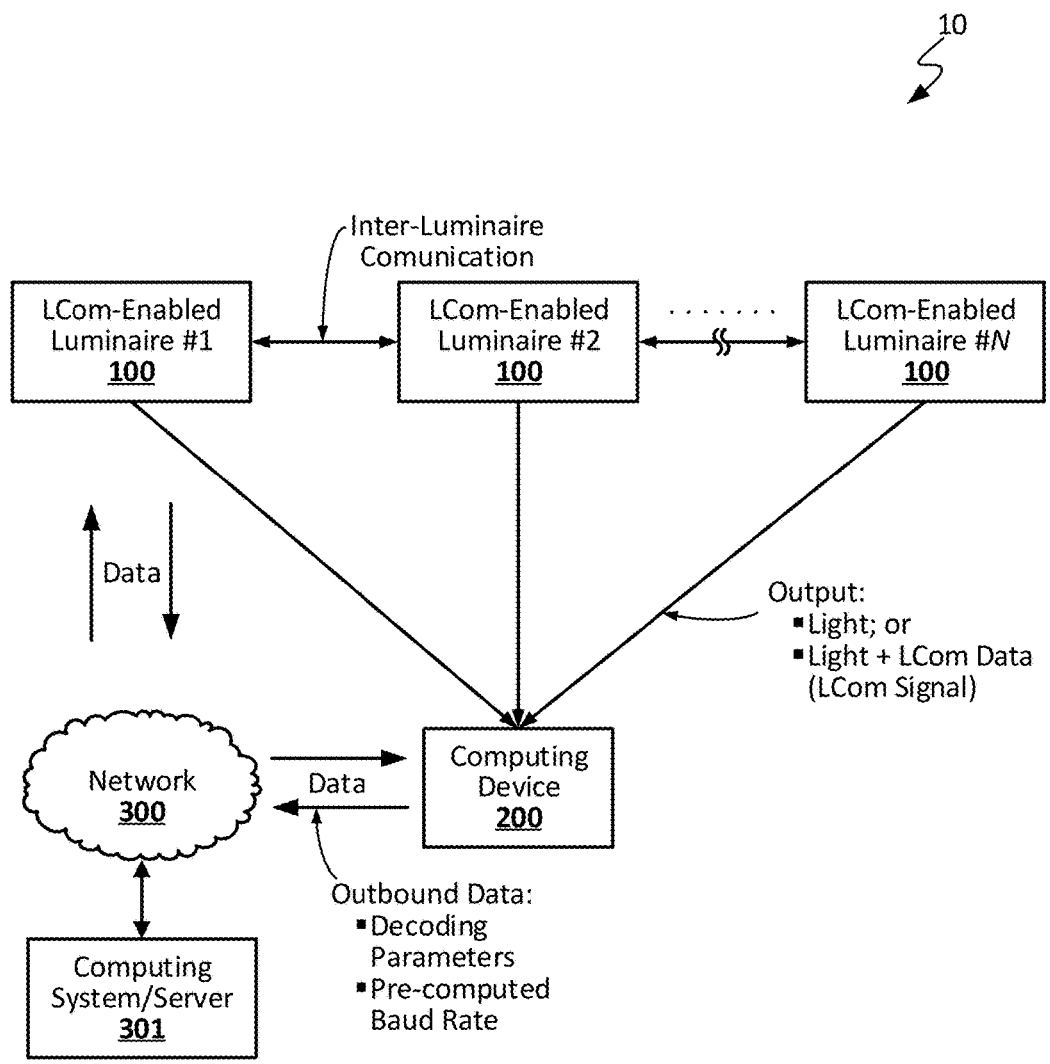
FIG. 1 is a block diagram illustrating an example light-based communication (LCom) system configured in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Techniques are disclosed for programming a luminaire position for light-based communication (LCom) luminaires within an array of luminaires using position information provided by passing mobile computing devices. A typical mobile computing device, such as a smartphone or a tablet, is commonly configured with locationing sensors, such as an accelerometer and gyroscope, which can be used to track movement of the device. Such sensor-based movement data can be used in conjunction with a known starting position to track the location of the mobile device, in accordance with an embodiment of the present disclosure. Thus, the position information from a given mobile device can be received by a given LCom luminaire as, for example, as a specific coordinate (e.g., x-y coordinates of a grid-based map) or as sensor-based movement data of the mobile computing device relative to an initial known reference location. Using such position information, the LCom luminaire may determine and store its position within the given venue. The LCom luminaire may broadcast that position so that it is available to LCom-based navigation applications, as will be appreciated in light of this disclosure. In accordance with some embodiments, the disclosed techniques can further be used to update or correct the luminaire position previously programmed into a luminaire that was subsequently moved to a new location. Numerous use cases and embodiments will be apparent in light of this disclosure.

Overview

Light-based communication ("LCom") systems include an array of multiple LCom enabled luminaires (sometimes referred to herein simply as a "luminaire" for brevity). Each LCom enabled luminaire uses a visible-light signal to transmit, for example, a position (e.g., a coordinate) that corresponds to the position of the luminaire. This position, when received by a mobile computing device, can then be used for navigation as a substitute or supplement to other means of navigation (such as GPS signals, commonly used for outdoor navigation). As will be further appreciated, LCom-based navigation can be used in areas where GPS-based navigation is unavailable, such as indoor or otherwise covered locations such as inside buildings, garages, and tunnels. In such LCom-based navigation systems, programming (or re-programming) a luminaire with its position is generally required for any newly installed luminaire. For the case of a newly installed luminaire that has yet to be programmed with its position, the luminaire may not transmit any position information at all. For the case of a newly installed luminaire that has been relocated from elsewhere in an array, the newly installed luminaire will transmit a position that corresponds to its prior, and now incorrect, location. In both of these cases, the luminaire must be programmed with a position corresponding to its current location. Such programming of luminaire position into a luminaire is typically carried out in a manual fashion, which is time consuming, labor intensive, and expensive. Another possible technique for automatically estimating luminaire position might include using triangulation algorithms based on transmissions from neighboring luminaires that do include their corresponding position information. However, such triangulation-based programming techniques require that the newly installed luminaire be within a line of sight of three other luminaires, and thus may limit the options for configuring of the array.

Thus, techniques are disclosed herein for determining a position of a newly installed or recently moved luminaire using position information from passing mobile computing devices (e.g., smartphones and tablets, or any other mobile computing device configured with navigation sensors for tracking movement, and a camera for receiving LCom signals). This position information can be received, for example, as a coordinate of a known grid or as a movement data of the mobile computing device relative to a known reference location, or as any other informative position data, whether it be in the form of a pre-computed absolute position within a given space or a pre-computed relative position within that space, or in the form that allows for deriving or otherwise computing of an absolute or relative position. The movement data can include an estimated displacement from the known reference location as determined by sensors (e.g., accelerometer and gyroscope) in the mobile computing device. Regardless of how the position information is determined or received, the newly installed luminaire (or recently moved luminaire, as the case may be) uses this position information to identify its location. In some embodiments, upon determining its position using the position information from the mobile computing device, the newly installed luminaire may evaluate or otherwise verify the accuracy of the determined position and assign a confidence level to the determined position value. In such embodiments, the luminaire will accept that determined position only if the confidence level satisfies some established threshold. Once position information is received (and optionally once accuracy has been verified), the newly installed luminaire may transmit its position to mobile computing devices to assist users with LCom-based navigation.

Prior to discussing details of techniques for self-locating LCom-enabled luminaires, LCom systems and methods are described in the context of FIGS. 1 to 6B. Further details of techniques for self-locating LCom-enabled luminaires are discussed with respect to FIGS. 7-10.

System Architecture

FIG. 1 is a block diagram illustrating an example light-based communication (LCom) system 10 configured in accordance with an embodiment of the present disclosure. As can be seen, system 10 may include one or more LCom-enabled luminaires 100 configured for light-based communicative coupling with a receiver computing device 200 via LCom signal(s). As discussed herein, such LCom may be provided, in accordance with some embodiments, via visible light-based signals. In some cases, LCom may be provided in only one direction; for instance, LCom data may be passed from a given LCom-enabled luminaire 100 (e.g., the transmitter) to a computing device 200 (e.g., the receiver), or from a computing device 200 (e.g., the transmitter) to a given LCom-enabled luminaire 100 (e.g., the receiver). In some other cases, LCom may be provided in a bi-directional fashion between a given LCom-enabled luminaire 100 and a computing device 200, where both act as a transceiver device capable of transmitting and receiving.

In some cases in which system 10 includes a plurality of LCom-enabled luminaires 100, all (or some sub-set thereof) may be configured for communicative coupling with one another so as to provide inter-luminaire communication. In one such scenario, for instance, the inter-luminaire communication can be used to notify other luminaries 100 that a given computing device 200 is currently present, as well as the position information for that particular luminaire 100. Such inter-luminaire communication is not needed, however, as will be appreciated in light of this disclosure.

As can be further seen in this example embodiment, system 10 allows for communicative coupling with a network 300 and one or more servers or other computer systems 301. Communicative coupling may be provided, for example, between network 300 and computing device 200 and/or one or more LCom-enabled luminaires 100, as desired. The network 300 may be a wireless local area network, a wired local network, or a combination of local wired and wireless networks, and may further include access to a wide area network such as the Internet or a campus-wide network. In short, network 300 can be any communications network.

The computer systems 301 may be any suitable computing system capable of communicating over a network 300, such as a cloud-based server computer, and may be programmed or otherwise configured to provide an LCom related service, according to some embodiments. For example, an LCom related service might be that the computer system 301 is configured to provide storage of mobile computing device position information, for example. Numerous other such configurations will be apparent in light of this disclosure.

Figure 2A:
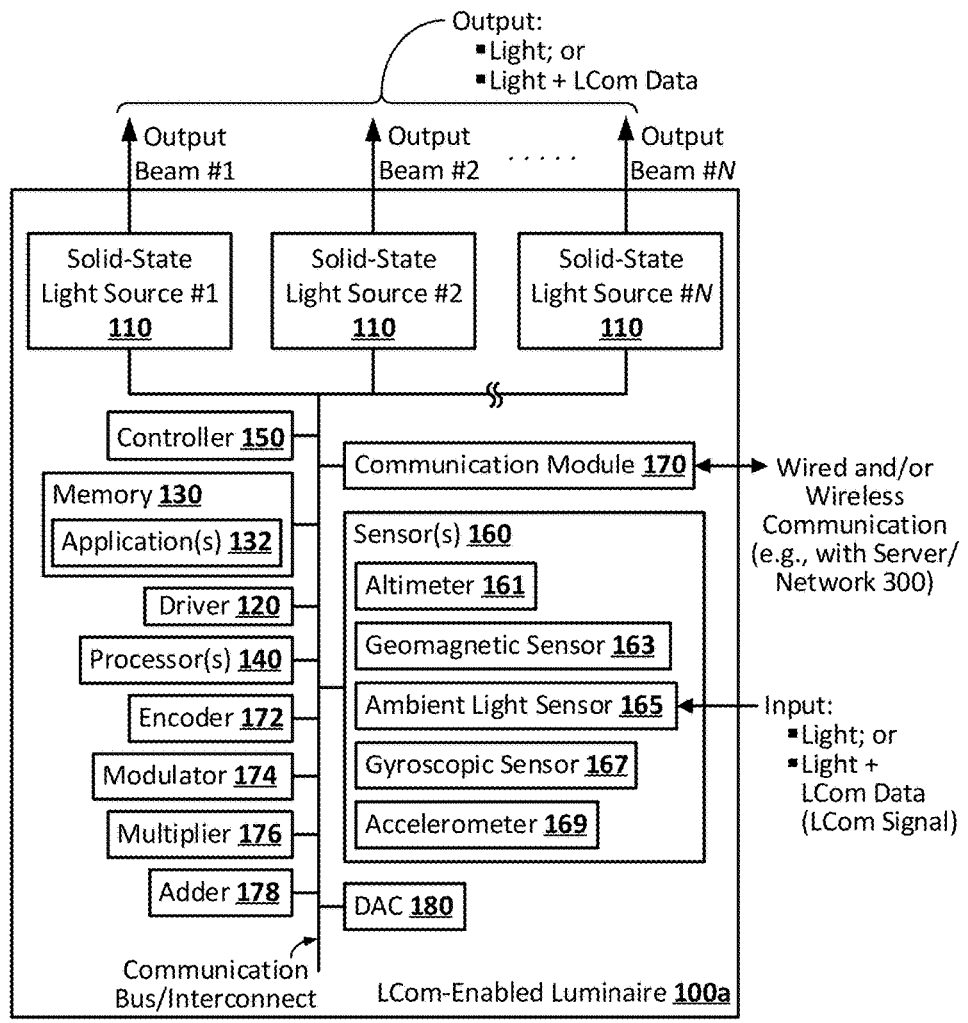
FIG. 2A is a block diagram illustrating an LCom-enabled luminaire configured in accordance with an embodiment of the present disclosure.
Figure 2B:
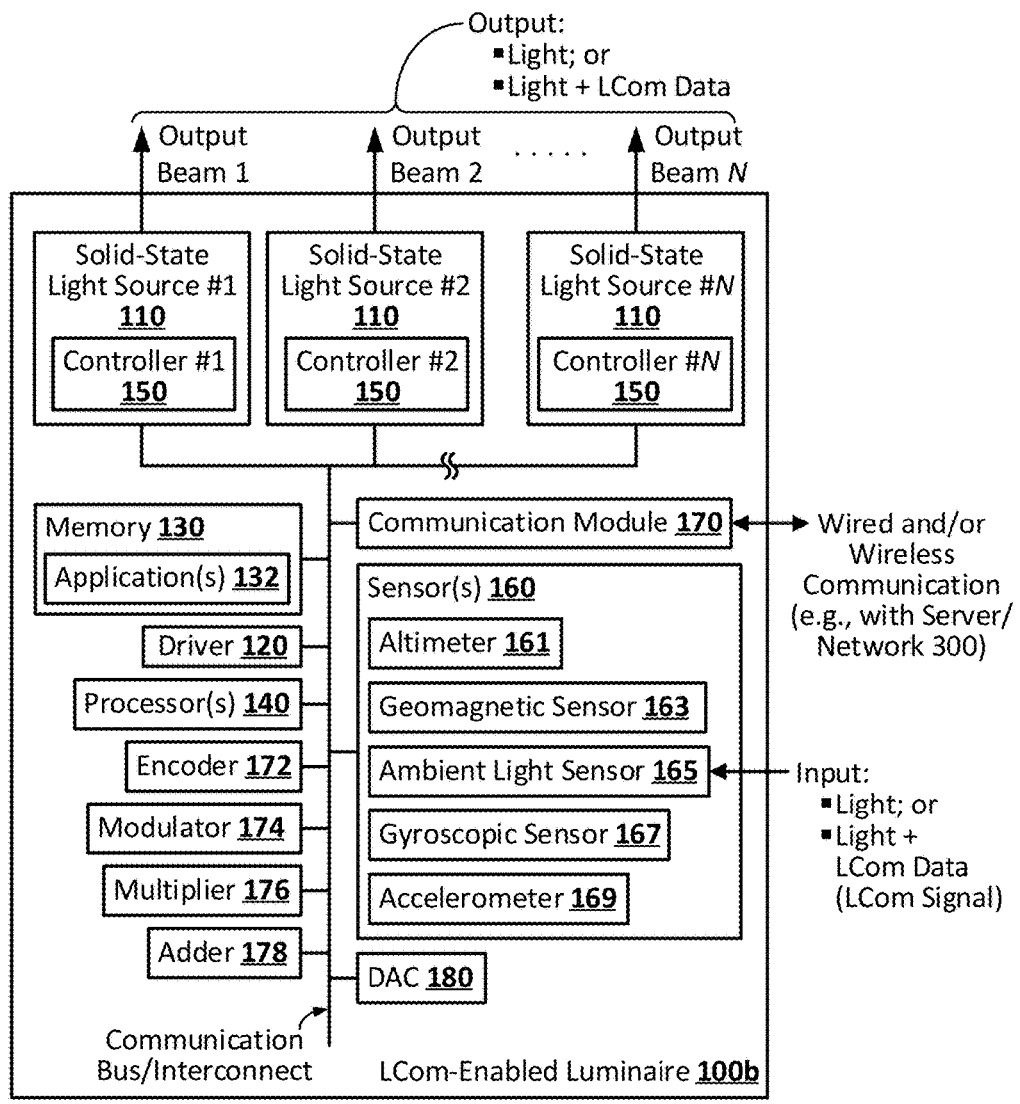
FIG. 2B is a block diagram illustrating an LCom-enabled luminaire configured in accordance with another embodiment of the present disclosure.

FIG. 2A is a block diagram illustrating an LCom-enabled luminaire 100a configured in accordance with an embodiment of the present disclosure. FIG. 2B is a block diagram illustrating an LCom-enabled luminaire 100b configured in accordance with another embodiment of the present disclosure. As can be seen, a difference between luminaire 100a and luminaire 100b is with respect to the location of controller 150. For consistency and ease of understanding of the present disclosure, LCom-enabled luminaires 100a and 100b hereinafter may be collectively referred to generally as an LCom-enabled luminaire 100, except where separately referenced. Further note that while various modules are shown as distinct modules for purposes of illustration, any number of the modules may be integrated with one or more other modules. For instance, the controller 150 may be integrated with the driver 120. Similarly, the processor(s) 140 and memory 130 may be integrated within the controller 150. Numerous other configurations can be used.

As can be seen, a given LCom-enabled luminaire 100 may include one or more solid-state light sources 110, in accordance with some embodiments. The quantity, density, and arrangement of solid-state light sources 110 utilized in a given LCom-enabled luminaire 100 may be customized, as desired for a given target application or end-use. A given solid-state light source 110 may include one or more solid-state emitters, which may be any of a wide range of semiconductor light source devices, such as, for example, a light-emitting diode (LED), an organic light-emitting diode (OLED), a polymer light-emitting diode (PLED), or a combination of any of these. A given solid-state emitter may be configured to emit electromagnetic radiation, for example, from the visible spectral band and/or other portions of the electromagnetic spectrum not limited to the infrared (IR)

spectral band and/or the ultraviolet (UV) spectral band, as desired for a given target application or end-use. In some embodiments, a given solid-state emitter may be configured for emissions of a single correlated color temperature (CCT) (e.g., a white light-emitting semiconductor light source). In other embodiments, a given solid-state emitter may be configured for color-tunable emissions. For instance, in some cases, a given solid-state emitter may be a multi-color (e.g., bi-color, tri-color, etc.) semiconductor light source configured for a combination of emissions, such as: (1) red-green-blue (RGB); (2) red-green-blue-yellow (RGBY); (3) red-green-blue-white (RGBW); (4) dual-white; and/or (5) a combination of any one or more thereof. In some cases, a given solid-state emitter may be configured as a high-brightness light source. In some embodiments, a given solid-state emitter may be provided with a combination of any one or more of the aforementioned example emissions capabilities. In any case, a given solid-state emitter can be packaged or non-packaged, as desired, and in some cases may be populated on a printed circuit board (PCB) or other suitable intermediate/substrate. In some cases, power and/or control connections for a given solid-state emitter may be routed from a given PCB to a driver 120 (discussed in turn below) and/or other devices/componentry, as desired. Other suitable configurations for the one or more solid-state emitters of a given solid-state light source 110 will depend on a given application and will be apparent in light of this disclosure.

A given solid-state light source 110 also may include one or more optics optically coupled with its one or more solid-state emitters. In accordance with some embodiments, the optic(s) of a given solid-state light source 110 may be configured to transmit the one or more wavelengths of interest of the light (e.g., visible, UV, IR, etc.) emitted by solid-state emitter(s) optically coupled therewith. To that end, the optic(s) may include an optical structure (e.g., a window, lens, dome, etc.) formed from any of a wide range of optical materials, such as, for example: (1) a polymer, such as poly(methyl methacrylate) (PMMA) or polycarbonate; (2) a ceramic, such as sapphire ($Al_2O_3$) or yttrium aluminum garnet (YAG); (3) a glass; and/or (4) a combination of any one or more thereof. In some cases, the optic(s) of a given solid-state light source 110 may be formed from a single (e.g., monolithic) piece of optical material to provide a single, continuous optical structure. In some other cases, the optic(s) of a given solid-state light source 110 may be formed from multiple pieces of optical material to provide a multi-piece optical structure. In some cases, the optic(s) of a given solid-state light source 110 may include optical features, such as, for example: (1) an anti-reflective (AR) coating; (2) a reflector; (3) a diffuser; (4) a polarizer; (5) a brightness enhancer; (6) a phosphor material (e.g., which converts light received thereby to light of a different wavelength); and/or (7) a combination of any one or more thereof. In some embodiments, the optic(s) of a given solid-state light source 110 may be configured, for example, to focus and/or collimate light transmitted there through. Other suitable types, optical transmission characteristics, and configurations for the optic(s) of a given solid-state light source 110 will depend on a given application and will be apparent in light of this disclosure.

In accordance with some embodiments, the one or more solid-state light sources 110 of a given LCom-enabled luminaire 100 may be electronically coupled with a driver 120. In some cases, driver 120 may be an electronic driver (e.g., single-channel; multi-channel) configured, for example, for use in controlling one or more solid-state emitters of a given solid-state light source 110. For instance, in some embodiments, driver 120 may be configured to control the on/off state, dimming level, color of emissions, correlated color temperature (CCT), and/or color saturation of a given solid-state emitter (or grouping of emitters). To such ends, driver 120 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of driver 120 to adjust AC voltage to driver 120); and/or (8) a combination of any one or more thereof. Other suitable configurations for driver 120 and lighting control/driving techniques will depend on a given application and will be apparent in light of this disclosure.

As will be appreciated in light of this disclosure, a given solid-state light source 110 also may include or otherwise be operatively coupled with other circuitry/componentry, for example, which may be used in solid-state lighting. For instance, a given solid-state light source 110 (and/or host LCom-enabled luminaire 100) may be configured to host or otherwise be operatively coupled with any of a wide range of electronic components, such as: (1) power conversion circuitry (e.g., electrical ballast circuitry to convert an AC signal into a DC signal at a desired current and voltage to power a given solid-state light source 110); (2) constant current/voltage driver componentry; (3) transmitter and/or receiver (e.g., transceiver) componentry; and/or (4) local processing componentry. When included, such componentry may be mounted, for example, on one or more driver 120 boards, in accordance with some embodiments.

As can be further seen from FIGS. 2A-2B, a given LCom-enabled luminaire 100 may include memory 130 and one or more processors 140. Memory 130 can be of any suitable type (e.g., RAM and/or ROM, or other suitable memory) and size, and in some cases may be implemented with volatile memory, non-volatile memory, or a combination thereof. A given processor 140 may be configured as typically done, and in some embodiments may be configured, for example, to perform operations associated with a given host LCom-enabled luminaire 100 and one or more of the applications 132 thereof (e.g., within memory 130 or elsewhere). In some cases, memory 130 may be configured to be utilized, for example, for processor workspace (e.g., for one or more processors 140) and/or to store media, programs, applications, and/or content on a host LCom-enabled luminaire 100 on a temporary or permanent basis. In one example embodiment, the memory 130 stores its position (whether programmed manually or received using an embodiment of the present disclosure) that indicates where the luminaire is deployed (for purposes of facilitating navigation, as previously explained), and may further include a look-up table (LUT) or other memory facility that indexes baud rates by computing device type. Table 1 shows an example look-up table according to one such embodiment. Assume that each of A through F represents a transmission baud rate which can be utilized by luminaires 100. Thus, in some cases, a given processor 140 can identify the baud rate at which the luminary 100 should transmit based on received decoding parameters (these parameters may be provided to network 300, for example, whether those parameters include high level information such as make and model of the subject computing device 200 or lower level information about that device 200 such as its sensing capability (e.g., camera imaging speed and resolution)).

TABLE 1

Baud Rates LUT

| Make | Model | | | | | |
|---|---|---|---|---|---|---|
| | 5S | 6S | Galaxy S6 | Galaxy S5 | Moto X | Moto G |
| Apple Inc. | A | B | | | | |
| Samsung | | | C | D | | |
| Motorola | | | | | E | F |

The one or more applications 132 stored in memory 130 can be accessed and executed, for example, by the one or more processors 140 of a given LCom-enabled luminaire 100. In accordance with some embodiments, a given application or module 132 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications or modules 132 can be instructions encoded on any suitable non-transitory machine-readable medium that, when executed by one or more processors 140, carries out functionality of a given LCom-enabled luminaire 100, in part or in whole. In one example embodiment, at least one of these modules 132 is a routine for determining luminaire position, based on a known reference location and an estimated mobile computing device location transmitted from computing device 200. In any case, the luminaire can broadcast a luminaire position using visible light communication (VLC) signals to passing computing devices 200.

In accordance with some embodiments, the one or more solid-state light sources 110 of a given LCom-enabled luminaire 100 can be electronically controlled, for example, to output light and/or light encoded with LCom data (e.g., an LCom signal). To that end, a given LCom-enabled luminaire 100 may include or otherwise be communicatively coupled with one or more controllers 150. In some such example embodiments, such as that illustrated in FIG. 2A, a controller 150 may be hosted by a given LCom-enabled luminaire 100 and operatively coupled (e.g., via a communication bus/interconnect) with the one or more solid-state light sources 110 (1–N) of that LCom-enabled luminaire 100. In this example case, controller 150 may output a digital control signal to any one or more of the solid-state light sources 110 and may do so, for example, based on wired and/or wireless input received from a given local source (e.g., such as on-board memory 130) and/or remote source (e.g., such as a control interface or network 300). As a result, a given LCom-enabled luminaire 100 may be controlled in such a manner as to output any number of output beams (1–N), which may include light and/or LCom data (e.g., an LCom signal), as desired for a given target application or end-use. However, the present disclosure is not so limited.

For example, in some other embodiments, such as that illustrated in FIG. 2B, a controller 150 may be packaged or otherwise hosted, in part or in whole, by a given solid-state light source 110 of a given LCom-enabled luminaire 100 and operatively coupled (e.g., via a communication bus/interconnect) with the one or more solid-state light sources 110. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some embodiments, controller 150 may be populated, for example, on one or more PCBs of the host solid-state light source 110. In this example case, controller 150 may output a digital control signal to an associated solid-state light source 110 of LCom-enabled luminaire 100 and may do so, for example, based on wired and/or wireless input received from a given local source (e.g., such as on-board memory 130) and/or remote source (e.g., such as a control interface, optional network 300, etc.). As a result, LCom-enabled luminaire 110 may be controlled in such a manner as to output any number of output beams (1–N), which may include light and/or LCom data (e.g., an LCom signal), as desired for a given target application or end-use.

In accordance with some embodiments, a given controller 150 may host one or more lighting control modules and can be programmed or otherwise configured to output one or more control signals, for example, to adjust the operation of the solid-state emitter(s) of a given solid-state light source 110 according to communicate luminaire position. For example, in some cases, a given controller 150 may be configured to output a control signal to control whether the light beam of a given solid-state emitter is on/off. In some instances, a given controller 150 may be configured to output a control signal to control the intensity/brightness (e.g., dimming; brightening) of the light emitted by a given solid-state emitter. In some cases, a given controller 150 may be configured to output a control signal to control the color (e.g., mixing; tuning) of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, controller 150 may be configured to output a control signal to encoder 172 (discussed below) to facilitate encoding of LCom data for transmission by a given LCom-enabled luminaire 100. In some embodiments, controller 150 may be configured to output a control signal to modulator 174 (discussed below) to facilitate modulation of an LCom signal for transmission by a given LCom-enabled luminaire 100. Other suitable configurations and control signal output for a given controller 150 of a given LCom-enabled luminaire 100 will depend on a given application and will be apparent in light of this disclosure.

In accordance with some embodiments, a given LCom-enabled luminaire 100 may include an encoder 172. In some embodiments, encoder 172 may be configured, for example, to encode LCom data in preparation for transmission thereof by the host LCom-enabled luminaire 100. To that end, encoder 172 may be provided with any suitable configuration, as will be apparent in light of this disclosure.

In accordance with some embodiments, a given LCom-enabled luminaire 100 may include a modulator 174. In some embodiments, modulator 174 may be configured, for example, to modulate an LCom signal in preparation for transmission thereof by the host LCom-enabled luminaire 100. In some embodiments, modulator 174 may be a single-channel or multi-channel electronic driver (e.g., driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), and/or color saturation of a given solid-state emitter (or grouping of emitters). To such ends, modulator 174 may utilize any of a wide range of driving techniques, including, for example: (1) a pulse-width modulation (PWM) dimming protocol; (2) a current dimming protocol; (3) a triode for alternating current (TRIAC) dimming protocol; (4) a constant current reduction (CCR) dimming protocol; (5) a pulse-frequency modulation (PFM) dimming protocol; (6) a pulse-code modulation (PCM) dimming protocol; (7) a line voltage (mains) dimming protocol (e.g., dimmer is connected before input of modulator 174 to adjust AC voltage to modulator 174); and/or (8) any other suitable lighting control/driving technique, as will be apparent in light of this disclosure. Other suitable configurations and control/driving techniques for modulator 174 will depend on a given application and will be apparent in light of this disclosure.

In accordance with some embodiments, a given LCom-enabled luminaire 100 may include a multiplier 176. Multiplier 176 may be configured as typically done, and in some example embodiments may be configured to combine an input received from an upstream modulator 174 with an input received from an ambient light sensor 165 (discussed below). In some instances, multiplier 176 may be configured to increase and/or decrease the amplitude of a signal passing there through, as desired. Other suitable configurations for multiplier 176 will depend on a given application and will be apparent in light of this disclosure. In accordance with some embodiments, a given LCom-enabled luminaire 100 may include an adder 178. Adder 178 may be configured as typically done, and in some example embodiments may be configured to combine an input received from an upstream multiplier 178 with a DC level input. In some instances, adder 178 may be configured to increase and/or decrease the amplitude of a signal passing there through, as desired. Other suitable configurations for adder 178 will depend on a given application and will be apparent in light of this disclosure.

In accordance with some embodiments, a given LCom-enabled luminaire 100 may include a digital-to-analog converter (DAC) 180. DAC 180 may be configured as typically done, and in some example embodiments may be configured to convert a digital control signal into an analog control signal to be applied to a given solid-state light source 110 of the host LCom-enabled luminaire 100 to output an LCom signal therefrom. Note that DAC 180 may further be integrated into controller 150, in some embodiments. Other suitable configurations will be apparent in light of this disclosure.

In accordance with some embodiments, a given LCom-enabled luminaire 100 may include one or more sensors 160. In some embodiments, a given LCom-enabled luminaire 100 optionally may include an altimeter 161. When included, altimeter 161 may be configured as typically done, and in some example embodiments may be configured to aid in determining the altitude of a host LCom-enabled luminaire 100 with respect to a given fixed level (e.g., a floor, a wall, the ground, or other surface). In some embodiments, a given LCom-enabled luminaire 100 optionally may include a geomagnetic sensor 163. When included, geomagnetic sensor 163 may be configured as typically done, and in some example embodiments may be configured to determine the orientation and/or movement of a host LCom-enabled luminaire 100 relative to a geomagnetic pole (e.g., geomagnetic north) or other desired heading, which may be customized as desired for a given target application or end-use. In some embodiments, a given LCom-enabled luminaire 100 optionally may include an ambient light sensor 165. When included, ambient light sensor 165 may be configured as typically done, and in some example embodiments may be configured to detect and measure ambient light levels in the surrounding environment of the host LCom-enabled luminaire 100. In some cases, ambient light sensor 165 may be configured to output a signal, for example, to a multiplier 176 of LCom-enabled luminaire 100. In some embodiments, a given LCom-enabled luminaire 100 optionally may include a gyroscopic sensor 167. When included, gyroscopic sensor 167 may be configured as typically done, and in some example embodiments may be configured to determine the orientation (e.g., roll, pitch, and/or yaw) of the host LCom-enabled luminaire 100. In some embodiments, a given LCom-enabled luminaire 100 optionally may include an accelerometer 169. When included, accelerometer 169 may be configured as typically done, and in some example embodiments may be configured to detect motion of the host LCom-enabled luminaire 100. In any case, a given sensor 160 of a given host LCom-enabled luminaire 100 may include mechanical and/or solid-state componentry, as desired for a given target application or end-use. Also, it should be noted that the present disclosure is not so limited only to these example optional sensors 160, as additional and/or different sensors 160 may be provided as desired for a given target application or end-use, in accordance with some other embodiments, or no sensors 160 may be provided, as the case may be. Numerous configurations will be apparent in light of this disclosure.

In accordance with some embodiments, a given LCom-enabled luminaire 100 may include a communication module 170, which may be configured for wired (e.g., Universal Serial Bus or USB, Ethernet, FireWire, etc.) and/or wireless (e.g., Wi-Fi, Bluetooth, etc.) communication, as desired. In accordance with some embodiments, communication module 170 may be a transceiver or other network interface circuit configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; and/or (6) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 170, as desired for a given target application or end-use. In some instances, communication module 170 may be configured to facilitate inter-luminaire communication between LCom-enabled luminaires 100. In addition or alternatively, communication module 170 may be configured so as to allow for receipt of information from network 300, such as luminaire position or estimated mobile computing device position information. As explained herein, the estimated mobile computing device position information associated with the computing device 200 can be used by the luminaire to compute luminaire position. Whether the estimated mobile computing device position is computed in real time at the luminaire or received from somewhere else, the estimated mobile computing device position information can then be used to generate the LCom signals emitted by that luminaire 100 to communicate luminaire position to passing computing devices 200. The communication module 170 may be configured to use any suitable wired and/or wireless transmission technologies (e.g., radio frequency, or RF, transmission; infrared, or IR, light modulation; etc.), as desired for a given target application or end-use. These transmission technologies may be implemented with a transceiver, for example a Bluetooth Beacon, integrated with or connected to the communications module 170. Other suitable configurations for communication module 170 will depend on a given application and will be apparent in light of this disclosure.

Figure 3:
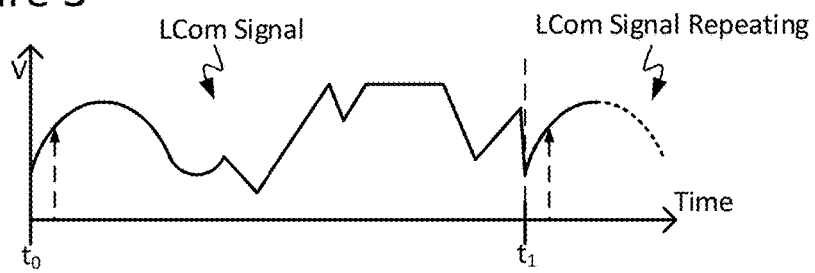
FIG. 3 illustrates an example arbitrary LCom signal as may be transmitted by an LCom-enabled luminaire, in accordance with an embodiment of the present disclosure.

As previously noted, a given LCom-enabled luminaire 100 may be configured, in accordance with some embodiments, to output light and/or light encoded with LCom data (e.g., an LCom signal). FIG. 3 illustrates an example arbitrary LCom signal as may be transmitted by an LCom-enabled luminaire 100, in accordance with an embodiment of the present disclosure. As can be seen here, LCom-enabled luminaire 100 may be configured to transmit a given LCom signal over a given time interval ($t_1-t_0$). In some cases, a given LCom-enabled luminaire 100 may be configured to repeatedly output its one or more LCom signals.

Figure 4:
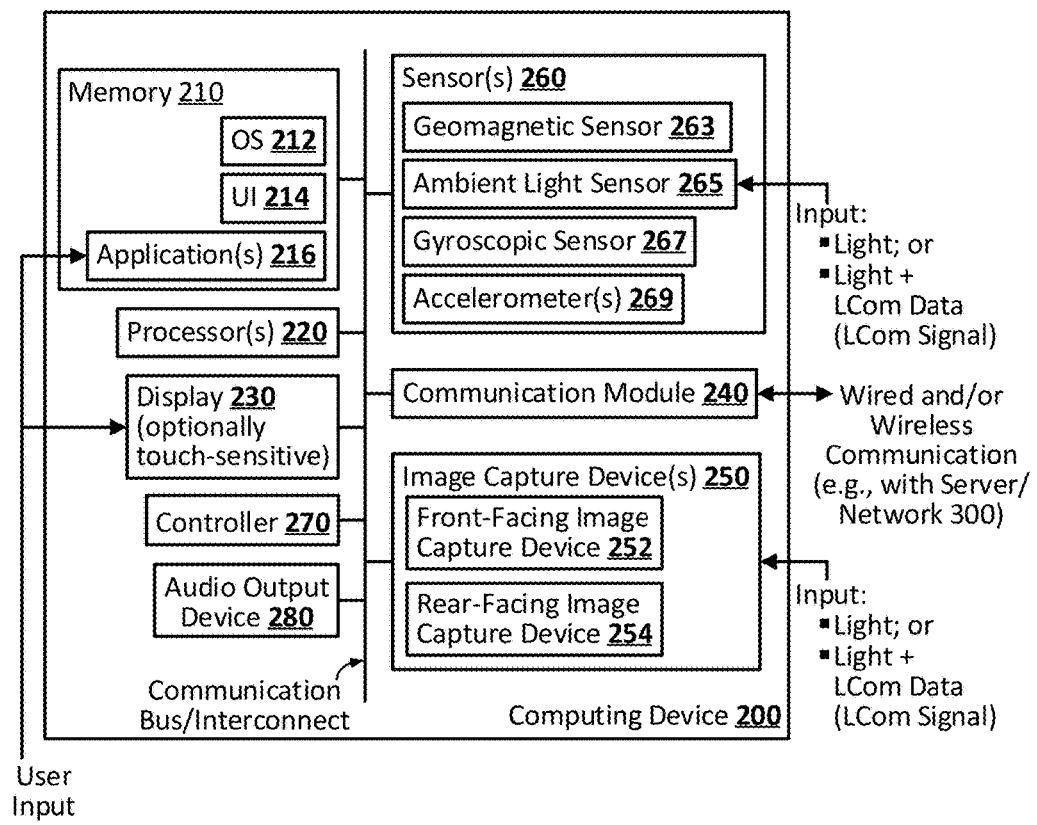
FIG. 4 illustrates an example computing device configured in accordance with an embodiment of the present disclosure.

FIG. 4 illustrates an example computing device 200 configured in accordance with an embodiment of the present disclosure. As discussed herein, computing device 200 may be configured, in accordance with some embodiments: (1) to detect the light pulses of an LCom signal emitted by a transmitting LCom-enabled luminaire 100; and (2) to decode the LCom data from a detected LCom signal. To these ends, computing device 200 can be any of a wide range of computing platforms, mobile or otherwise. For example, in accordance with some embodiments, computing device 200 can be, in part or in whole: (1) a laptop/notebook computer or sub-notebook computer; (2) a tablet or phablet computer; (3) a mobile phone or smartphone; (4) a personal digital assistant (PDA); (5) a portable media player (PMP); (6) a cellular handset; (7) a handheld gaming device; (8) a gaming platform; (9) a desktop computer; (10) a television set; (11) a wearable or otherwise body-borne computing device, such as a smartwatch, smart glasses, or smart headgear; and/or (12) a combination of any one or more thereof. Other suitable configurations for computing device 200 will depend on a given application and will be apparent in light of this disclosure.

As can be further seen from FIG. 4, computing device 200 may include memory 210 and one or more processors 220. Memory 210 can be of any suitable type (e.g., RAM and/or ROM, or other suitable memory) and size, and in some cases may be implemented with volatile memory, non-volatile memory, or a combination thereof. A given processor 220 of computing device 200 may be configured as typically done, and in some embodiments may be configured, for example, to perform operations associated with computing device 200 and one or more of the modules thereof (e.g., within memory 210 or elsewhere). In some cases, memory 210 may be configured to be utilized, for example, for processor workspace (e.g., for one or more processors 220) and/or to store media, programs, applications, and/or content on computing device 200 on a temporary or permanent basis. The one or more modules stored in memory 210 (e.g., such as OS 212, UI 214, and/or one or more applications 216) can be accessed and executed, for example, by the one or more processors 220 of computing device 200. Similar to memory 130 of the luminaires 100, memory 210 of the device 200 may include information that can be used to compute or otherwise calculate an estimated mobile computing device location, as will be appreciated in light of this disclosure.

Operating System (OS) 212 can be implemented with any suitable OS, mobile or otherwise, such as, for example: (1) Android OS from Google, Inc.; (2) iOS from Apple, Inc.; (3) BlackBerry OS from BlackBerry Ltd.; (4) Windows Phone OS from Microsoft Corp; (5) Palm OS/Garnet OS from Palm, Inc.; (6) an open source OS, such as Symbian OS; and/or (7) a combination of any one or more thereof. As will be appreciated in light of this disclosure, OS 212 may be configured, for example, to aid in processing LCom data during its flow through computing device 200. Other suitable configurations and capabilities for OS 212 will depend on a given application and will be apparent in light of this disclosure. A user interface (UI) module 214 is provided as commonly done, and generally allows for user interaction with the device 200 (e.g., such as a graphical touched-based UI on various smartphones and tablets). Any number of user interface schemes can be used.

In accordance with some embodiments, memory 210 may have stored therein (or otherwise have access to) one or more applications 216. In some instances, computing device 200 may be configured to receive input, for example, via one or more applications 216 stored in memory 210 (e.g., such as an indoor navigation application). In accordance with some embodiments, a given application or module 216 can be implemented in any suitable standard and/or custom/proprietary programming language, such as, for example: (1) C; (2) C++; (3) objective C; (4) JavaScript; and/or (5) any other suitable custom or proprietary instruction sets. In a more general sense, the applications 216 can be instructions encoded on any suitable non-transitory machine-readable medium that, when executed by one or more processors 220, carries out functionality of a given computing device 200, in part or in whole. In one example embodiment, at least one of these applications 216 is a routine programmed or otherwise configured to provide decoding parameters of computing device 200 to luminaire 100, so that luminaire 100 can determine an estimated location for the computing device 200. The computing device 200 may provide the estimated computing device location to the luminaire 100, either directly via the communications module 130 including a transceiver or indirectly via a network 300 and computer system/server 301. At least one application 216 may be further configured to receive LCom signals and decode those signals. In addition, at least one application 216 may be further configured to also monitor the luminaire for any changes (orientation, with respect to computing device 200). Likewise, in some embodiments, at least one application 216 may be further configured to optionally try to adjust its own settings to optimize decoding in effort to deal with situations where control by luminaire 100 is not available, for whatever reason.

As can be seen further from FIG. 4, computing device 200 may include a display 230, in accordance with some embodiments. Display 230 can be any electronic visual display or other device configured to display or otherwise generate an image (e.g., image, video, text, and/or other displayable content) there at. In some instances, display 230 may be integrated, in part or in whole, with computing device 200, whereas in some other instances, display 230 may be a stand-alone component configured to communicate with computing device 200 using any suitable wired and/or wireless communications means. In some cases, display 230 optionally may be a touchscreen display or other touch-sensitive display. To that end, display 230 may utilize any of a wide range of touch-sensing techniques, such as, for example: (1) resistive touch-sensing; (2) capacitive touch-sensing; (3) surface acoustic wave (SAW) touch-sensing; (4) infrared (IR) touch-sensing; (5) optical imaging touch-sensing; and/or (6) a combination of any one or more thereof. In a more general sense, and in accordance with some embodiments, an optionally touch-sensitive display 230 generally may be configured to detect or otherwise sense direct and/or proximate contact from a user's finger, stylus, or other suitable implement at a given location of that display 230. In some cases, an optionally touch-sensitive display 230 may be configured to translate such contact into an electronic signal that can be processed by computing device 200 (e.g., by the one or more processors 220 thereof) and manipulated or otherwise used to trigger a given UI action. In some cases, a touch-sensitive display 230 may facilitate user interaction with computing device 200 via the UI 214 presented by such display 230. Numerous suitable configurations for display 230 will be apparent in light of this disclosure.

In accordance with some embodiments, computing device 200 may include a communication module 240, which may be a transceiver or other network interface circuit configured for wired (e.g., Universal Serial Bus or USB, Ethernet, FireWire, etc.) and/or wireless (e.g., Wi-Fi, Bluetooth, etc.) communication using any suitable wired and/or wireless transmission technologies (e.g., radio frequency, or RF, transmission; infrared, or IR, light modulation; etc.), as desired. In accordance with some embodiments, communication module 240 may be configured to communicate locally and/or remotely utilizing any of a wide range of wired and/or wireless communications protocols, including, for example: (1) a digital multiplexer (DMX) interface protocol; (2) a Wi-Fi protocol; (3) a Bluetooth protocol; (4) a digital addressable lighting interface (DALI) protocol; (5) a ZigBee protocol; (6) a near field communication (NFC) protocol; (7) a local area network (LAN)-based communication protocol; (8) a cellular-based communication protocol; (9) an Internet-based communication protocol; (10) a satellite-based communication protocol; and/or (11) a combination of any one or more thereof. It should be noted, however, that the present disclosure is not so limited to only these example communications protocols, as in a more general sense, and in accordance with some embodiments, any suitable communications protocol, wired and/or wireless, standard and/or custom/proprietary, may be utilized by communication module 240, as desired for a given target application or end-use. In some instances, communication module 240 may be configured to communicate with one or more LCom-enabled luminaires 100 via network 300. Numerous suitable configurations for communication module 240 will depend on a given application and will be apparent in light of this disclosure.

Also, as can be seen from FIG. 4, computing device 200 may include one or more image capture devices 250, such as a front-facing image capture device 252 and/or a rear-facing image capture device 254, in accordance with some embodiments. For consistency and ease of understanding of the present disclosure, front-facing image capture device 252 and rear-facing image capture device 254 hereinafter may be collectively referred to generally as an image capture device 250, except where separately referenced. A given image capture device 250 can be any device configured to capture digital images, such as a still camera (e.g., a camera configured to capture still photographs) or a video camera (e.g., a camera configured to capture moving images comprising a plurality of frames). In some cases, a given image capture device 250 may include typical components such as, for instance, an optics assembly, an image sensor, and/or an image/video encoder, and may be integrated, in part or in whole, with computing device 200. A given image capture device 250 can be configured to operate using light, for example, in the visible spectrum and/or other portions of the electromagnetic spectrum not limited to the infrared (IR) spectrum, ultraviolet (UV) spectrum, etc. In some instances, a given image capture device 250 may be configured to continuously acquire imaging data. As described herein, a given image capture device 250 of computing device 200 may be configured, in accordance with some embodiments, to detect the light and/or LCom signal output of a transmitting LCom-enabled luminaire 100. In some instances, a given image capture device 250 may be, for example, a camera like one typically found in smartphones or other mobile computing devices. Numerous other suitable configurations for a given image capture device 250 (e.g., front-facing image capture device 252; rear-facing image capture device 254) of computing device 200 will depend on a given application and will be apparent in light of this disclosure.

In accordance with some embodiments, computing device 200 may include one or more sensors 260. In some embodiments, computing device 200 optionally may include a geomagnetic sensor 263. When included, geomagnetic sensor 263 may be configured as typically done, and in some example embodiments may be configured to determine the orientation and/or movement of a host computing device 200 relative to a geomagnetic pole (e.g., geomagnetic north) or other desired heading, which may be customized as desired for a given target application or end-use. In some embodiments, computing device 200 optionally may include an ambient light sensor 265. When included, ambient light sensor 265 may be configured as typically done, and in some example embodiments may be configured to detect and measure ambient light levels in the surrounding environment of the host computing device 200. In some embodiments, computing device 200 optionally may include a gyroscopic sensor 267. When included, gyroscopic sensor 267 may be configured as typically done, and in some example embodiments may be configured to determine the orientation (e.g., roll, pitch, and/or yaw) of the host computing device 200. In some embodiments, computing device 200 optionally may include an accelerometer 269. When included, accelerometer 269 may be configured as typically done, and in some example embodiments may be configured to detect motion of the host computing device 200. As a result of using these inertial sensors, the computing device 200 may provide highly accurate position information. The accuracy of this position information may result in improved navigation system operation, because the luminaire position determined using the information from the multiple data points from the inertial sensors will likely be more accurate than a luminaire position calculated using a single data point. In any case, a given sensor 260 of a given host computing device 200 may include mechanical and/or solid-state componentry, as desired for a given target application or end-use. Also, it should be noted that the present disclosure is not so limited only to these example optional sensors 260, as additional and/or different sensors 260 may be provided, as desired for a given target application or end-use, in accordance with some other embodiments. Numerous sensor configurations for device 200 will be apparent in light of this disclosure.

In accordance with some embodiments, computing device 200 may include or otherwise be communicatively coupled with one or more controllers 270. A given controller 270 may be configured to output one or more control signals to control any one or more of the various components/modules of computing device 200 and may do so, for example, based on wired and/or wireless input received from a given local source (e.g., such as on-board memory 210) and/or remote source (e.g., such as a control interface, optional network 300, etc.). In accordance with some embodiments, a given controller 270 may host one or more control modules and can be programmed or otherwise configured to output one or more control signals, for example, to adjust the operation of a given portion of computing device 200. For example, in some cases, a given controller 270 may be configured to output a control signal to control operation of a given image capture device 250, and/or to output a control signal to control operation of one or more sensors 260. Numerous other configurations and control signal output for a given controller 270 of computing device 200 will depend on a given application and will be apparent in light of this disclosure.

As can be seen further from FIG. 4, computing device 200 may include an audio output device 280, in accordance with some embodiments. Audio output device 280 can be, for example, a speaker or any other device capable of producing sound from an audio data signal, in accordance with some embodiments. Audio output device 280 can be configured, for example, to reproduce sounds local to and/or received by its host computing device 200. In some instances, audio output device 280 may be integrated, in part or in whole, with computing device 200, whereas in some other instances, audio output device 280 may be a stand-alone component configured to communicate with computing device 200 using any suitable wired and/or wireless communications means, as desired. Numerous other suitable types and configurations for audio output device 280 will depend on a given application and will be apparent in light of this disclosure.

Network 300 can be any suitable public and/or private communications network. For instance, in some cases, network 300 may be a private local area network (LAN) operatively coupled to a wide area network (WAN), such as the Internet. In some cases, network 300 may include one or more second-generation (2G), third-generation (3G), fourth-generation (4G), and/or fifth generation (5G) mobile communication technologies. In some cases, network 300 may include a wireless local area network (WLAN) (e.g., Wi-Fi wireless data communication technologies). In some instances, network 300 may include Bluetooth wireless data communication technologies. In some cases, network 300 may include supporting infrastructure and/or functionalities, such as a server and a service provider (e.g., computer system 301), but such features are not necessary to carry out communication via network 300. In some instances, computing device 200 may be configured for communicative coupling, for example, with a network 300 and one or more LCom-enabled luminaires 100. In some cases, computing device 200 may be configured to receive data from network 300, for example, which serves to supplement LCom data received by computing device 200 from a given LCom-enabled luminaire 100. In some instances, computing device 200 may be configured to receive data (e.g., such as known reference position information, luminaire position, luminaire identifiers, and/or other data pertaining to a given LCom-enabled luminaire 100) from network 300 that facilitates navigation via one or more LCom-enabled luminaires 100. Numerous configurations for network 300 will be apparent in light of this disclosure.

Figure 5A:
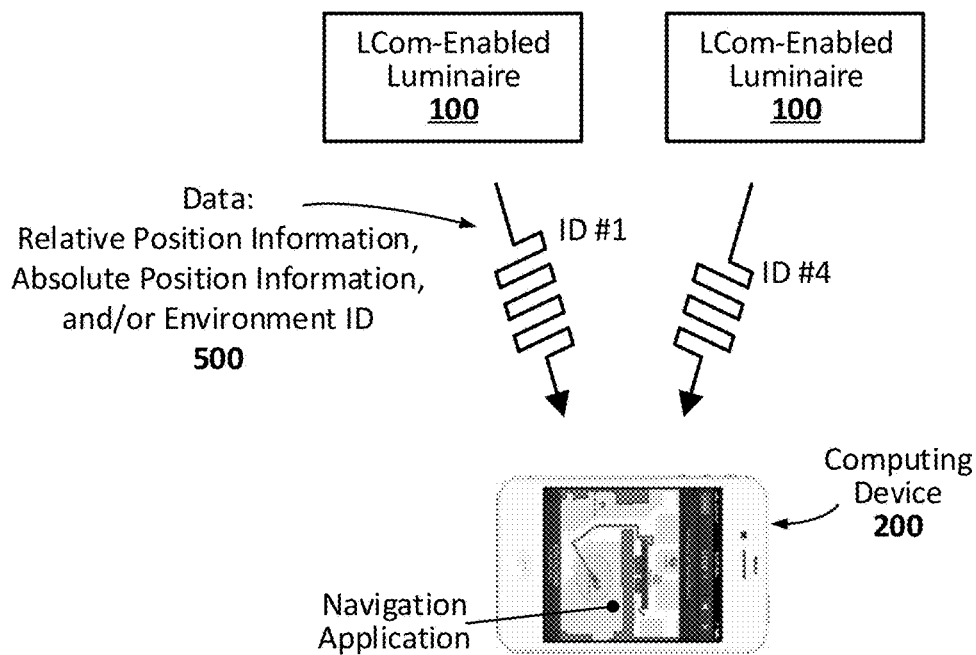
FIG. 5A illustrates an example LCom system, including an LCom-enabled luminaire and a computing device, in accordance with an embodiment of the present disclosure.

FIG. 5A illustrates an example LCom system, including an LCom-enabled luminaire and a computing device, in accordance with an embodiment of the present disclosure. As can be seen, this example scenario includes two luminaires 100 each communicating with a computing device 200, which happens to be a smartphone running an LCom-based navigation application. The navigation application can be, for instance, one of the applications 216 stored in memory 210 and executed by processor(s) 220. As can be further seen, the LCom signals being communicated include data 500, which generally includes position information, which may be used to navigate. For instance, if the user is receiving light from a specific luminaire 100 that has a known location, then the navigation application 'knows' where the user is and can continue to guide the user along the targeted path.

The position information 500 transmitted by the luminaires 100 may come in any number of forms. For instance, in some embodiments, the luminaire positions may be communicated as a relative position (e.g., relative to another luminaire 100, or some other object having a known position), and/or as an absolute position (e.g., x-y coordinates of a grid-based map). In still other embodiments, the luminaire position may be communicated as an environment ID, wherein the transmitted ID translates to a specific location on a given map of the environment being navigated. In some such example cases, for instance, a luminaire might use dual tone multi-frequency (DTMF) encoding, which means it continuously sends two unique frequencies.

Figure 5B:
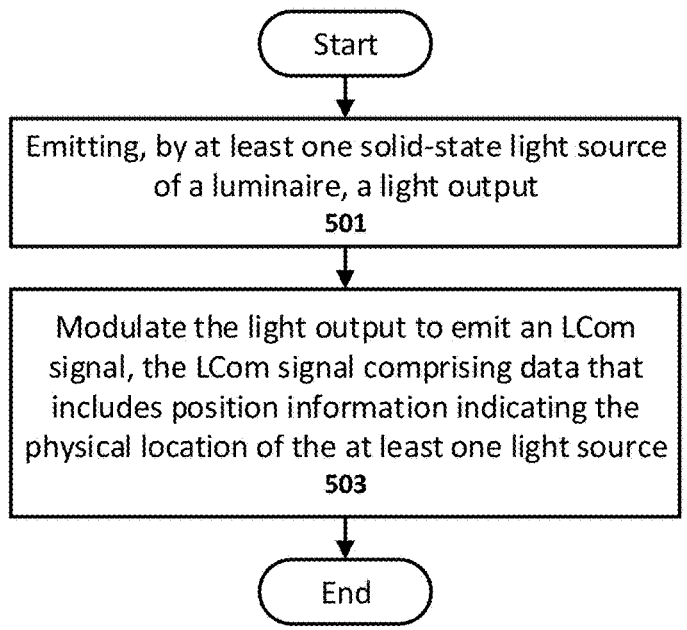
FIG. 5B illustrates an example method for emitting position information from an LCom-enabled luminaire, in accordance with an embodiment of the present disclosure.
Figure 5C:
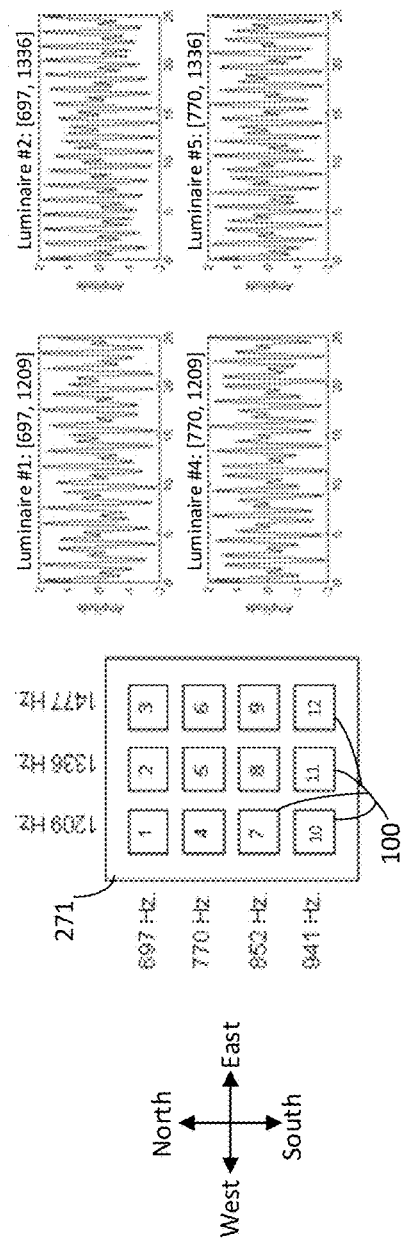
FIG. 5C illustrates an example graphical map of LCom-enabled luminaires deployed in a given venue, and corresponding LCom transmissions indicating the location of that particular luminaire within the venue, in accordance with an embodiment of the present disclosure.

FIG. 5C shows how an example DTMF-based ID system might work. As can be seen, a given environment 271 is the area being navigated and has a number of LCom-enabled luminaires 101. The environment 271 may be, for example, a super market or retail store, or a shopping mall, or a parking garage, or a large office space, to name a few examples. The environment 271 is effectively divided into a grid of physical locations, each location being associated with at least one luminaire 100. As can be further seen, each luminaire 100 is associated with two unique frequencies that it can transmit on a regular basis. The two unique frequencies can thus be used to correlate that particular luminaire's position to a specific location within the environment. For instance, if the user is receiving light from luminaire #1 (which transmits 697 Hz and 1209 Hz in this example embodiment), then the navigation application 'knows' that the user is in the North-West corner of the environment 271; similarly, if the user is receiving light from luminaire #12 (which transmits 941 Hz and 1477 Hz in this example embodiment), then the navigation application 'knows' that the user is in the South-East corner of the environment; and so on. So, in one example scenario, assuming that environment 271 is a store selling goods of some kind, each location can be associated with a specific product or range of products. Thus, a user can be led to a given product location by the navigation application, according to some embodiments. Note that the entire frequency-based grid can be scaled to higher or lower frequencies and still operate as described here to uniquely identify the location of individual luminaires 100.

FIG. 5B illustrates an example method for emitting position information from an LCom-enabled luminaire, in accordance with an embodiment of the present disclosure. As can be seen, the method includes emitting, by at least one solid-state light source of a luminaire, a light output in block 501. The method further includes modulating the light output to emit an LCom signal in block 503, the LCom signal comprising data that includes position information indicating the physical location of the at least one light source. According to some embodiments, this position information may indicate that particular luminaire's location directly by virtue of relative or absolute position information, as previously explained. In other embodiments, this position information may indicate that particular luminaire's location indirectly by virtue of an environment ID that translates to a specific location on a given map of the environment being navigated. Numerous other embodiments and variations using luminaires having known locations within a given area to be navigated will be apparent in light of this disclosure.

Figure 5D:
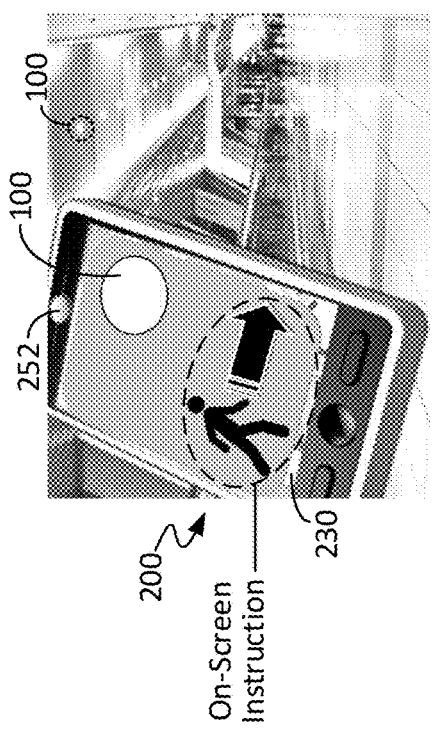
FIG. 5D illustrates an example scenario in which a computing device is configured to output instruction by way of visual feedback to a user, in accordance with an embodiment of the present disclosure.

FIG. 5D illustrates an example scenario in which a computing device 200 receiving LCom signals from luminaries 100 and is configured to output a navigational instruction by way of visual feedback to a user, in accordance with an embodiment of the present disclosure. Note how the actual luminaire 100 in the physical space being navigated is being imaged by way of camera 252, and the resulting image of that luminaire 100 is provided on the display 230 of the device 200. Based on receiving LCom signals from that luminaire 100 (which indicate the position of that luminaire 100), the navigation application continues to guide the user with a visual cue (an arrow in this example case). As the user progresses down the passageway, each subsequent luminaire 100 that is similarly imaged and processed by the device 200 allows the navigational guidance to continue, until the user arrives at the luminaire associated with the user's intended destination.

Figure 6A:
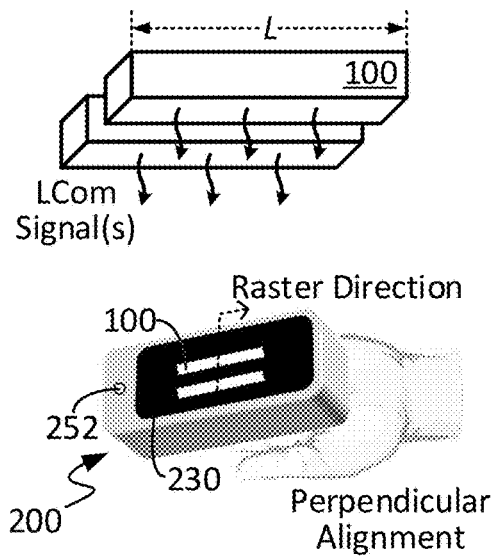
FIGS. 6A and 6B each illustrate example orientations between luminaires and a computing device, and how that affects the ability of the device raster lines to decode LCom messages from the luminaires.
Figure 6B:
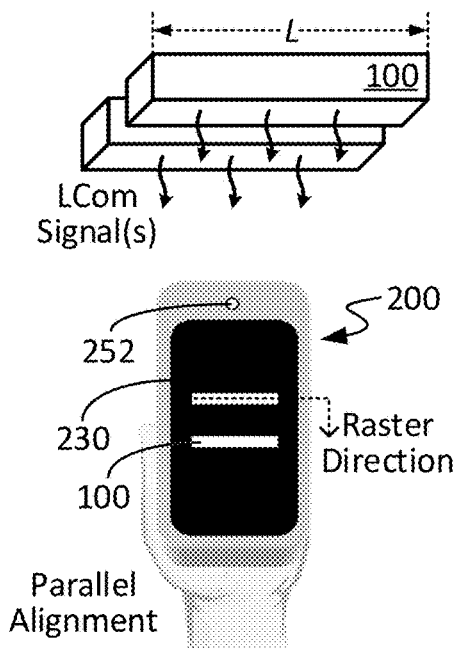

FIGS. 6A and 6B show a user holding the computing device 200 in two different orientations. The computing device 200 in this example is a smartphone, but can be any other suitable computing device as well. As can be seen, the device 200 includes a front-facing image capture device 252 that is currently imaging the above-luminaires 100, and the resulting image is shown on display 230. Two luminaires are being imaged, as can be further seen. In FIG. 6A, the user is holding the computing device 200 where the luminaires 100 are perpendicular to the raster lines (and therefore parallel to the raster direction). For this case, the luminaires 100 being imaged spans the maximum number of raster lines. Assume, for example, a camera frame having 750 raster lines perpendicular to the raster direction. Thus, a luminaire imaged with the device 200 in that orientation will span the maximum of a relatively large number of raster lines (e.g., 350 raster lines or more). However, in the example of FIG. 6B, the luminaires 100 are parallel to the raster lines (and therefore perpendicular to the raster direction). Consequently, each imaged luminaire 100 effectively spans only a fraction of the raster lines, or otherwise fewer raster lines relative to when the device 200 is in the opposite orientation shown in FIG. 6A. While in some cases the user can be directed to orient the device 100 to be more like the orientation shown in FIG. 6A (to improve the ability of device 200 to receive and process LCom messages from luminaires 100), other embodiments can solve this rastering problem through a variable baud rate which has the advantage of not requiring any effort/manual intervention with the user of the device 200.

Determining a Position of a Newly Installed LCom Luminaire

As described above, some embodiments of the present disclosure enable programming a newly installed luminaire with its position using position information from a passing mobile computing device. This allows a newly installed luminaire to determine its position without manual programming.

Figure 7:
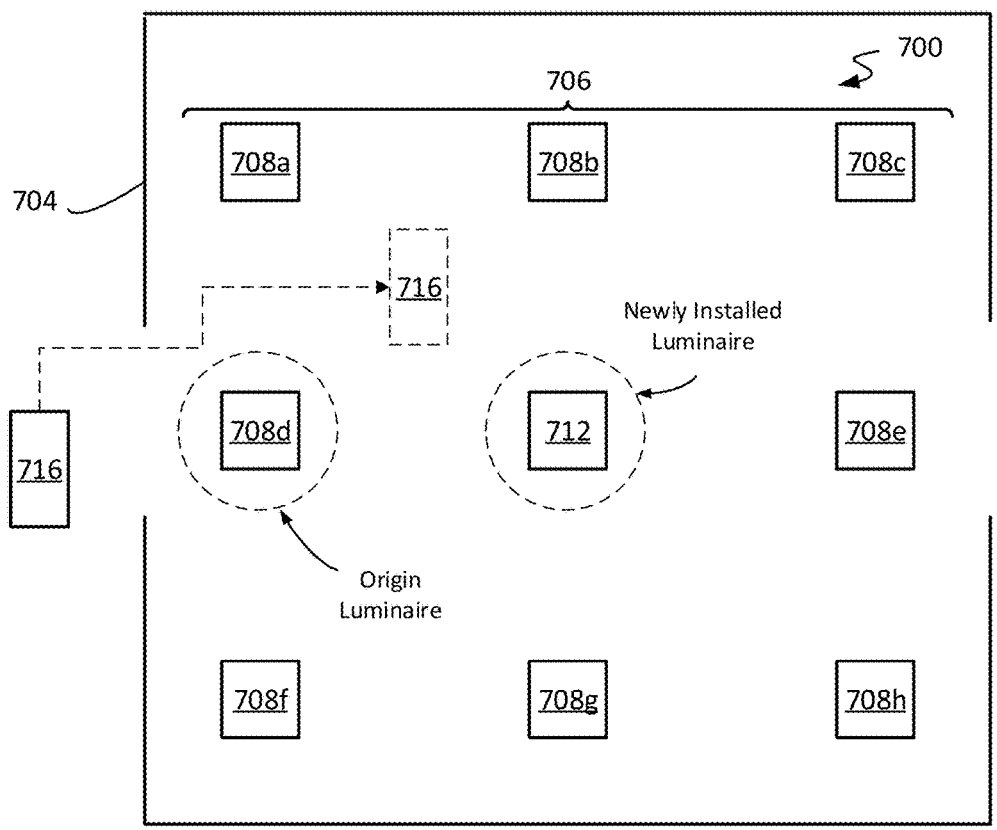
FIG. 7 illustrates an array of LCom enabled luminaires configured in accordance with an embodiment of the present disclosure.

FIG. 7 schematically illustrates an environment in which an embodiment of the present disclosure is implemented, so that a newly installed luminaire identifies its position within an array of LCom enabled luminaires using position information from a passing mobile computing device. As can be seen, the environment is provided in the context of a navigation system 700, which includes an array 706 of previously installed LCom enabled luminaires 708a through 708h (collectively 708), a newly installed LCom enabled luminaire 712, and a mobile computing device 716. The navigation system 700 is disposed within a structure 704, which generally can be any venue where navigation may be helpful to visitors.

As shown by a dashed line, the mobile computing device 716 enters the structure 704. Upon entering the structure 704, the mobile computing device 716 receives a known reference location broadcast from luminaire 708d. In some embodiments described herein, the luminaire 708d is designated as an "origin" or "origin luminaire." The designation of luminaire 708d as the origin is for convenience because this luminaire is near an entry to the structure 704 and thus is likely to be the first luminaire to communicate, even if only briefly, with many, if not all, mobile computing devices 716 entering the structure 704. One or more additional luminaires of the array 706 may also be used as one or more respective reference locations for reasons described below in more detail. As will be appreciated in light of this disclosure, the known reference location broadcast from luminaire 708d to the mobile computing device 716 can be used by the mobile computing device 716 to compute the subsequent locations of that mobile computing device 716, as mobile computing device 716 moves within the structure 704.

After receiving a known reference location from the origin luminaire 708d, the mobile computing device 716 may measure distances and directions of travel (shown by the dashed line in FIG. 7) using sensors of the mobile computing device. Thus, movement of the mobile computing device 716 can be tracked between the known reference location of the origin luminaire 708d and a location of the mobile computing device 716 proximate to a newly installed luminaire 712. The mobile computing device 716 then may transmit to the newly installed luminaire 712 position information. In one example embodiment, this position information provided by the mobile computing device 716 to luminaire 712 includes: (1) the known reference location received from the origin luminaire 708d; and (2) the distances and directions of travel of the mobile computing device 716 from the origin luminaire 708d to the location proximate to the newly installed luminaire 712. Using this information, the newly installed luminaire 712 is programmed or otherwise configured to estimate its position within the array 706 and/or within the structure 704, according to an embodiment.

A newly installed luminaire 712, in some cases, can be an existing luminaire that is relocated within the array 706, as previously described. An existing luminaire, however, does not have to be relocated to be a newly installed luminaire 712. When an existing luminaire is repaired and re-installed in the same location, for example, the repairs may result in a loss of luminaire position data. Without this data, the luminaire may be unable to broadcast its position, despite, not being re-located within the array 706. Thus, an existing luminaire that has been repaired and re-installed in the same location may also be a newly installed luminaire 712 and programmed with luminaire position as described herein. In other cases, a newly installed luminaire 712 can be a luminaire installed for the first time in the array 706, such as, a new luminaire. A new luminaire may be installed for a number of reasons, for example, when a luminaire is added to increase the size of the array 706 or when replacing an existing luminaire in the array 706. To this end, note a newly installed luminaire 712 may be any luminaire that is not programmed with a luminaire position prior to installation in the array 706.

In the example shown in FIG. 7, the structure 704 has four sides, two openings allowing access to and egress from the structure, but this relatively simple depiction is for convenience of explanation only. In some instances the structure 704 may be an entire building or a complex of buildings, examples of which include, but are not limited to, an office building, a retail store, a shopping mall, a warehouse, an airport, and manufacturing facilities. In some embodiments the structure 704 may not be a permanent structure. For example, temporary staging at a construction site may have a navigation system 700 for assisting employees with navigating a job site. As will be described below in more detail, the type of position information transmitted to and from the LCom enabled luminaires 708a through 708h and 712 may depend on the type of structure 704 and more specifically, whether or not the structure 704 is stationary or moving.

The array 706 of luminaires 708 can be two or more luminaires located within the structure 704. As indicated above, the array 706 is used to assist a mobile computing device user navigating the structure 704. The luminaires 708 and 712 may be configured in a variety of formations. For example, FIG. 7 shows an array 706 of luminaires 708 and 712 configured in a grid. In other embodiments of the present disclosure, the array 706 may consist of luminaires 708 and 712 configured in a circular pattern or along an arc. In yet other embodiments, the array 706 may consist of luminaires 708 and 712 that are arranged along a path, aisle, or walkway. In a more general sense, the array 706 may be configured in any regular or irregular pattern, so long as at least one of the luminaires 708 can be used to provide a known reference location to a passing mobile device 716.

Figure 8:
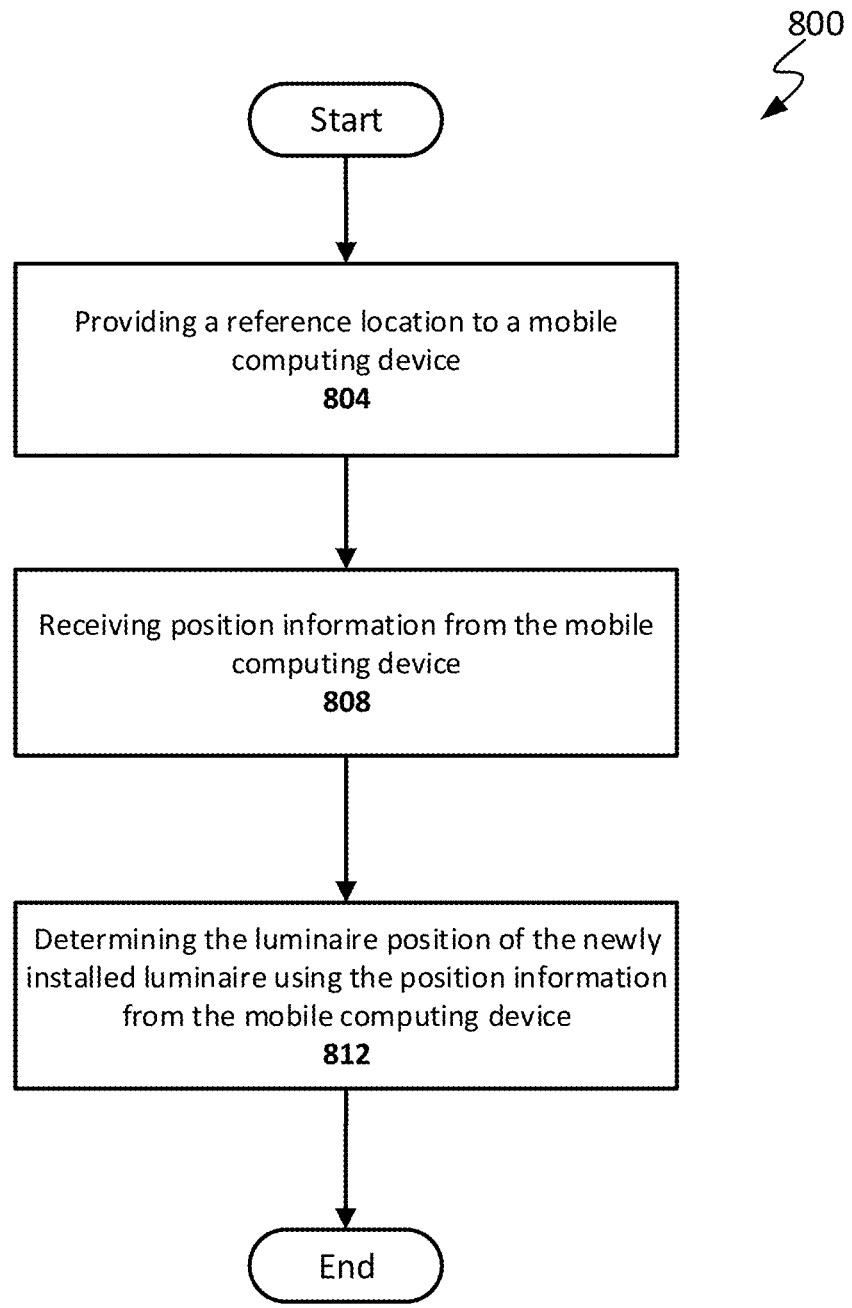
FIG. 8 is a flowchart illustrating an example method for determining the position of a newly installed LCom enabled luminaire within an array of luminaires, the LCom enabled luminaire configured to carryout bi-directional communication directly with a mobile computing device, in accordance with an embodiment of the present disclosure.

FIG. 8 illustrates an example method 800 for determining the position of a newly installed luminaire 712 within an array 706 of the navigation system, in accordance with an embodiment of the present disclosure. As can be seen, the method 800 includes providing a known reference location to a mobile computing device in block 804. The reference location may be provided from the origin luminaire 708d as described above using any convenient transmission protocol (e.g., RF, VLC). In one embodiment, the known reference location may be information that identifies a specific location relative to the structure 704, relative to the array 706, or some other frame of reference. A known reference location may be provided in the form of a set of coordinates associated with a point, area or object (such as the origin luminaire 708d) within or outside the array 706. The known reference location can be located at a position within a structure 704 and/or an array 706 that is convenient, such as at a point by which mobile computing devices 716 are likely to pass by, for example, at an entryway or along a walkway in the structure 704.

In further embodiments, there may be more than one known reference location (i.e., more than one origin luminaire) for the array 704. Having multiple known reference locations may be beneficial for improving the accuracy of the position information transmitted to the newly installed luminaire 712. As the mobile computing device 716 moves further away from an origin luminaire (e.g., 708d), the accuracy of the position information may decrease. This is because each measurement of the sensors of the mobile computing device 716 may be susceptible to some element of imprecision or inaccuracy (e.g., due to measurement error or calibration error). As more measurements are taken over a larger distance of travel, the cumulative error can increase. Thus, an array 706 having more than one origin luminaire may provide a more accurate estimate of a location of the mobile computing device 716 because fewer measurements may need to be taken by sensors of the mobile computing device 716 between a given origin luminaire 708d and the position of the newly installed luminaire 712, which in turn reduces the cumulative error possible in multiple measurements. Origin luminaires may also be strategically positioned in an array 706 at entrances, exits, or confluences of traffic (e.g., at a junction of multiple aisles in a store) of the structure 704 where there is a high volume of passing mobile computing device users.

The method 800 further includes receiving position information from the mobile computing device at a newly installed luminaire in block 808. The position information can be computed by the mobile computing device 716 based on the known reference location provided in block 804 and the supplemental location information provided by the sensors of the mobile computing device 716, as mobile computing device 716 is moved around (presumably by its owner) within the structure 704. The receipt of the position information from the mobile computing device 716 can be initiated in any of several ways. For example, in one example embodiment, the newly installed luminaire 712 may broadcast a request for position information to which the mobile computing device 716 responds. Or, in another example, the newly installed luminaire 712 may broadcast a luminaire position that is incorrect or inconsistent with the known reference location provided in block 804 (for example, using a different format of coordinate). Or a mobile computing device 716 may identify a luminaire that is not transmitting its position at all, and the mobile computing device 716 may provide position information in an effort to assist that luminaire with determining its position. A mobile computing device 716 may recognize that a newly installed luminaire is not broadcasting its position, for example, by receiving from that luminaire a VLC signal that contains a luminaire identifier without a luminaire position. In other embodiments, the newly installed luminaire 712 may send an error message using a VLC signal to instruct the mobile computing device 716 user to transmit position information to the newly installed luminaire 712. The position information may be received by the communications module of the newly installed luminaire 712 via wireless network, for example Wi-Fi or Bluetooth network connection. In some embodiments, the position information of the mobile computing device 716 may be stored in the memory of the newly installed luminaire 712.

As previously noted, the position information received in block 808 by the newly installed luminaire may be determined, for example, by using the known reference location provided in block 804 and the supplemental sensor-based location data of the mobile computing device 716. For example, the position information may be determined by the mobile computing device 716 using the known reference location (received in block 804, which may be, for instance, in the form of coordinates) and an estimated displacement of the mobile computing device 716 from that known reference location. Thus, in such cases, the mobile computing device 716 may process the raw position information into a known location (pre-computed position information), and provide that pre-computed position information to the newly installed luminaire 712. In still other embodiments, the mobile computing device 716 may send raw position information, such as the most recently received known reference location and the sensor-based displacement data of the mobile computing device 716 relative to that known reference location to the newly installed luminaire 712. The newly installed luminaire 712 may then compute the position information based on the received raw position information.

The method 800 further includes, at the newly installed luminaire, determining a luminaire position of the newly installed luminaire 712 based on the position information received from the mobile computing device 716 in block 812. Upon receiving the position information from the mobile computing device 716 in block 808, the newly installed luminaire 712 may determine its position in the array 706 using the position information. If the position information is received in its raw form, the newly installed luminaire 712 may determine its position using the processor(s) and other associated infrastructure located within the newly installed luminaire 712. On the other hand, if the position information is pre-computed at the mobile computing device 716, the newly installed luminaire 712 may determine its position by simply reading or otherwise receiving the pre-computed position information provided. Once the newly installed luminaire 712 has determined or otherwise acquired its position, the luminaire position value can be stored in the luminaire memory and may remain constant until the luminaire is manually reset or moved to another position.

When an existing luminaire is moved to a new position, the existing luminaire is considered a newly installed luminaire. In some embodiments, the installer may manually reset the relocated luminaire to trigger that luminaire to broadcast a request at the new luminaire position. In yet other embodiments, the relocated luminaire may detect that it has been moved based upon receiving estimated mobile computing device position information that is not consistent with a luminaire position currently stored within the relocated luminaire. As a result, the relocated luminaire may stop broadcasting its position, and transition to broadcasting a request for a new luminaire position, or simply use the updated position information received. Thus, the relocated luminaire may be programmed or otherwise configured to evaluate position information inputs from mobile computing devices and automatically update the luminaire position stored in memory of that luminaire. Once the luminaire position is updated, the relocated luminaire may begin broadcasting the updated luminaire position.

As previously described, various embodiments of the present disclosure enable programming of a newly installed luminaire with its position based on position information from passing mobile computing devices via a server. This allows a newly installed luminaire to not only receive its position without manual programming and without (i.e., line of sight) communication from surrounding luminaires, but also enables the installation of less sophisticated luminaires to reduce system costs.

Figure 9:
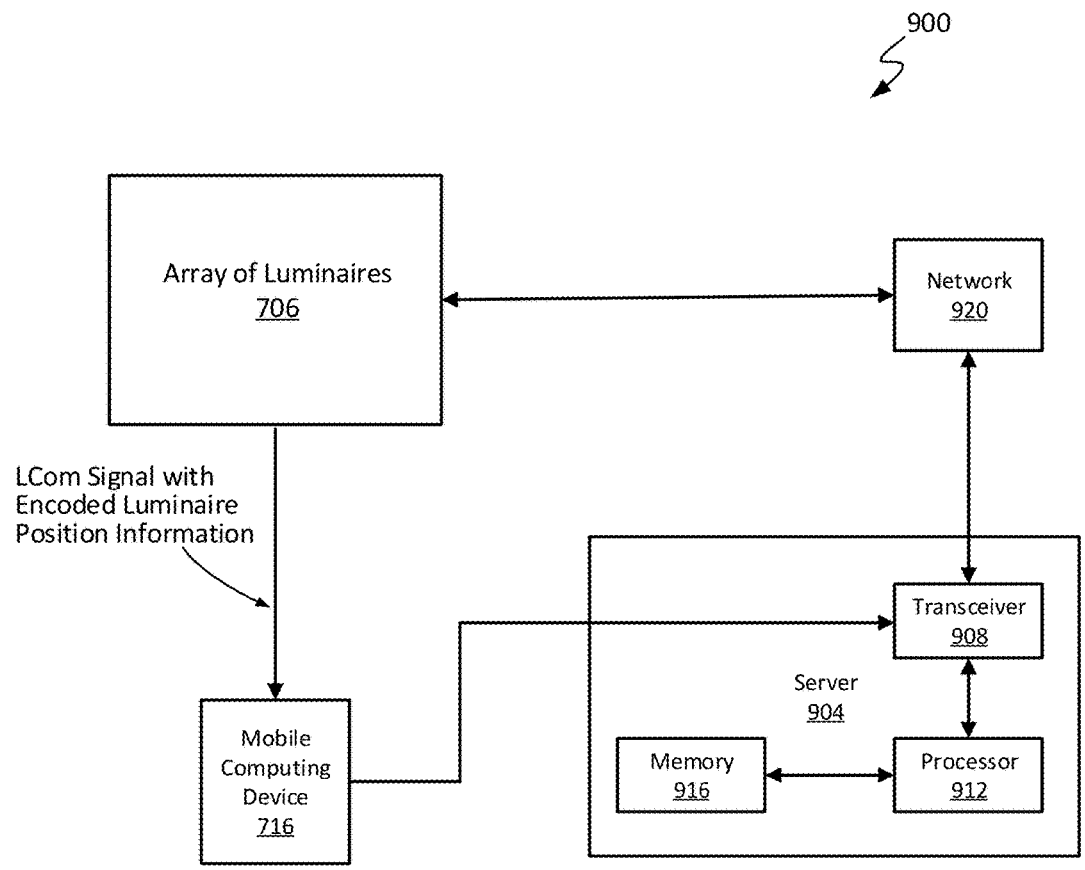
FIG. 9 is a block diagram illustrating a navigation system, in accordance with an embodiment of the present disclosure.

FIG. 9 illustrates a system 900 in which a newly installed luminaire is programmed with its position in an array of LCom enabled luminaires based on position information from a passing mobile computing device that is processed by a server and then passed to the luminaire, according to an embodiment of the present disclosure. The navigation system 900 includes an array 706 of LCom enabled luminaires, a mobile computing device 716, and a server 904.

As can be seen, the server 904 communicates with the mobile computing device 716 and the array 706 via one or more communication networks 920 (e.g., such as a wireless local area network operatively coupled to the Internet, or some other communication network that allows communication between the various components of system 900; any standard communication network technologies can be used, as will be appreciated in light of this disclosure). The server 904 may be implemented with standard server technology, and generally includes a computer and a computer program executable thereon that manages access to a centralized resource or service in a network. The server 904 may also provide files and services that are used by at least one of the luminaires of array 706 and mobile computing device 716.

Upon recognizing that the newly installed luminaire is broadcasting its luminaire identifier but not broadcasting its position, the mobile computing device 716 may be placed in communication (via the network 920) with the server 904 to provide the location of the mobile computing device 716 as a luminaire position to the newly installed luminaire. In response, the server 904 may receive the position data and luminaire identifier from the mobile computing device 716. Using this information, the server 904 identifies and determines a position of the newly installed luminaire. The server 904 may then transmit the determined position to the newly installed luminaire via the network 920. Note that the network 920 used by the mobile device 716 to communicate with server 904 may be different than the network 920 used by the array 706 to communicate with server 904, but they need not be. In one embodiment, network 920 includes a local wireless network that is operatively connected to the Internet. In one such case, both the mobile device 716 and the array 706 are both configured to communicatively couple with the local wireless network and can access the Internet accordingly. The newly installed luminaire may then broadcast its position using the information provided by the server 904.

The server 904 may further include or otherwise be operatively coupled to a transceiver 908 that receives and transmits communication signals to facilitate the exchange of information between the server 904 and other devices of the navigation system 900. Transceiver 908, for example, may be located within or otherwise operatively coupled with the server 904 and configured with standard technology to facilitate wired and/or wireless communication with one or more other transceivers located inside and/or outside the array 706. In some embodiments, the transceiver 908 is a modem, or other suitable circuitry that allows for transmitting and receiving data from a network. The communication signals may contain a variety of information, for example protocol information, navigation system access request and status information, and luminaire position. Once the mobile computing device 716 has estimated its position using supplemental location data generated by internal sensors (e.g., accelerometer and gyroscope), the mobile computing device may transmit its position to the server 904. The server 904 may receive this information via network 920. In the example embodiment shown, the transceiver 908 may then communicate this information to one or more processors 912 of the server 904, which in turn are programmed or otherwise configured to compile and distribute instructions and data to the luminaires within the array 706.

For example, in some embodiments, the one or more processors 912 are configured to process received position information and provide the processed position information to newly installed luminaires. The data created and/or managed by the processors 912 may be stored within a memory 916 to support various operations of the server 904. Memory 916 may be any physical component capable of non-transitory data storage. Regardless of whether information is stored in the memory 916 of server 904, the server 904 may transmit information to one or more of the luminaires of the array 706 via network 920.

Figure 10:
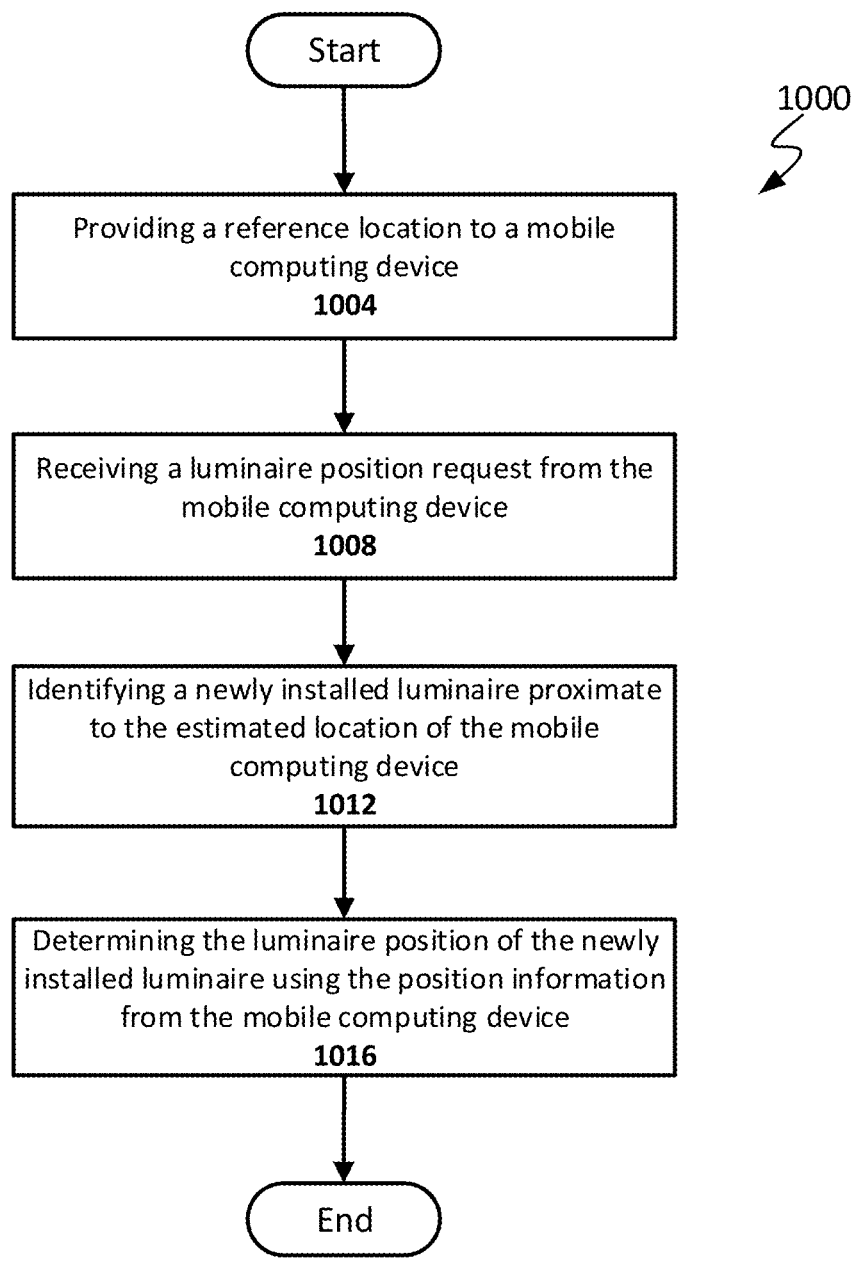
FIG. 10 is a flowchart illustrating an example method for determining the position of a newly installed LCom enabled luminaire within an array of luminaires, the LCom enabled luminaire configured to carryout bi-directional communication with a mobile computing device indirectly via a server, in accordance with an embodiment of the present disclosure.

FIG. 10 is a flowchart illustrating an example method 1000 for determining the position of a newly installed LCom enabled luminaire within an array of luminaires, the LCom enabled luminaire configured to carryout bi-directional communication with mobile computing device 716 indirectly via server 904, in accordance with an embodiment of the present disclosure. As can be seen, the method 1000 includes providing a known reference location to mobile computing device 716 in block 1004. Unlike the embodiment shown in FIG. 8 in which the known reference location is provided directly from a luminaire to mobile device 716 via a local communication channel (e.g., via an LCom signal received by camera of device 716), the known reference location in this example embodiment may be transmitted or communicated to mobile computing device 716 via the server 904 using network 920. However, as will be appreciated in light of this disclosure, the known reference location can also be provided directly from the luminaire to mobile device 716 via a local communication channel. To this end, while FIG. 10 is intended to show functionality of server 904, other embodiments may be configured such that some of the depicted functionality is carried out by the mobile device 716, or the luminaire, or the server 904, or some combination of these components.

The method 1000 further includes receiving a luminaire position request at the server 904 from the mobile computing device 716 in block 1008. In one example use case, the mobile computing device 716 enters the field of view of the newly installed luminaire, for example luminaire 712 of FIG. 7, the mobile computing device 716 may receive a VLC broadcast signal that does not include a luminaire position. In some embodiments, the newly installed luminaire may send an error message via a VLC signal that may instruct the mobile computing device 716 to transmit a luminaire position request to server 904. The server address may also be included with the newly installed luminaire VLC broadcast signal. In other embodiments the server address may already be known by the mobile computing device 716 (e.g., where the mobile computing device 716 registers with server 904 and the server address is made available to the mobile computing device 716, as part of a registration process of an indoor navigation service available by server 904). Using the server address, the mobile computing device 716 may transmit a luminaire position request via network 920 to server 904. In an example case, the luminaire position request may result in subsequent communications between the server 904 and the mobile computing device 716 to provide additional information to the server 904. To reduce the number of communications between the mobile computing device and server, the luminaire position request may include additional information, for example position information of the mobile computing device 716 and a luminaire identifier, to be used by the server 904 for computing an absolute or relative position of the newly installed luminaire.

The method 1000 further includes identifying a newly installed luminaire proximate to the estimated location of the mobile computing device 716 in block 1012. Upon receipt of the position information from the mobile computing device 716, the server 904 may identify a newly installed luminaire using information stored in the memory of the server. Information stored on the server 904 may include, for example, look-up tables, GPS coordinate listings correlated to x-y coordinates of a grid-based map, building maps/plans, and/or notes from the navigational array installer or manager. Using this information, the newly installed luminaire may be identified using a number of methods. One method, for example, may include the server 904 being programmed or otherwise configured to cross-reference a luminaire identifier for the newly installed luminaire with a listing of all the luminaires installed in the array. The luminaire listing may include a luminaire identifier, position, date of installation, and other operational information. Other methods may use coordinate information of the mobile computing device 716 and a look-up table having a listing of all the luminaires of the array indexed by coordinates. The server 904 uses the coordinates from the estimated position of the mobile computing device 716 to find the corresponding luminaire listing having the same position (or the closest match, as the case may be).

The method 1000 further includes determining the actual luminaire position of the newly installed luminaire using the estimated mobile computing device location in block 1016. The server may determine a luminaire position for a newly installed luminaire using a variety of methods. One method may include the server comparing the position information (e.g., set of coordinates) from the mobile computing device with a value from a look-up table. If the information is consistent (i.e., within a particular tolerance range) then the server may determine the position of the newly installed luminaire to be the value from the look-up table. To this end, note that the determining in block 1016 can effectively be part of the identifying in block 1012. The server 904 can then download or otherwise program the value from the look-up table into the newly installed luminaire, so that luminaire can then begin to broadcast the luminaire position. In this example use case, the luminaire position information may be stored in the memory 916 or a register of the server 904. The information may be accessed by and/or transmitted to the newly installed luminaire via a wired and/or wireless network. The newly installed luminaire may store the information in memory of the luminaire for generating the VLC signal.

Luminaire position information, however, does not need to be stored in the newly installed luminaire for all cases. In some cases, once the server 904 has determined the luminaire position, the server 904 may transmit this information in real time to one or more drivers of the luminaire. In response, the newly installed luminaire may generate VLC signals using streaming data (e.g., luminaire position information) from the server 904. In this case, the luminaire position information may not be stored in the newly installed luminaire.

In some instances, the server 904 may elect to use the position information from the mobile computing device 716 to program the newly installed luminaire. In this example, the position information from the mobile computing device 716 may be more accurate than the value from the look-up table. The server 904, in other embodiments, may also update the value in the look-up table using the position information of one or more mobile computing devices to improve the accuracy of the information in the look-up table.

If the luminaire position stored on the server 904 is inconsistent with the position information of the mobile computing device 716, then the server 904 may determine that the information stored on the server 904 is no longer valid. A discrepancy between information stored on the server 904 and the information provided mobile computing device 716 may occur, for example, when the newly installed luminaire is an existing luminaire that has been moved to a new location. The newly installed luminaire may maintain identification markings and/or information associated with its previous position. When the server 904 uses this information, the server 904 may recall a luminaire position associated with the luminaire's previous position. Upon identifying this inconsistency, the server 904 may update the luminaire position stored on the server 904 (e.g. a look-up table value) in accordance with the position information received from the mobile computing device 716.

When the newly installed luminaire is a replacement luminaire or an additional luminaire to the array 706, the server 904 may not contain any information regarding this newly installed luminaire. In this example, the server 904 may receive luminaire identification information that does not correspond to information stored on the server 904. In response, the server 904 may use the luminaire identification information received from the mobile computing device 716 to create new luminaire information (e.g., a new entry in the look-up table) on the server 904. The luminaire information may then be associated with position information from the mobile computing device 716 to create a luminaire position. This luminaire position may then be used to program the newly installed luminaire. The server 904, in further embodiments, may also use the position information from several mobile computing devices to evaluate information stored on the server 904 as part of a continuous learning process. The continuous learning process may be a series of actions or steps that the server 904 performs to validate the accuracy of the luminaire position that is stored on the server.

Improving Precision of Luminaire Position

Once the position of the newly installed luminaire has been determined, the luminaire position can be further refined to more accurately determine the position of the newly installed luminaire. Refining the luminaire position may be accomplished by either the luminaire itself or a server associated with the array or even the mobile computing device. For ease of understanding and readability of this disclosure, the following paragraphs will describe embodiments where the newly installed luminaire improves the precision of its position. In other cases, however, a server may perform the actions for improving the precision of the determined position for the newly installed luminaire. In still other example embodiments, the various actions may be performed on multiple components, such as any combination of the server, mobile computing device, and luminaire.

Improving the accuracy of the luminaire position using multiple inputs enables the navigation system to provide accurate luminaire position information to mobile computing devices. In response to receiving this accurate luminaire position, the mobile computing devices may more efficiently navigate the structure associated with the array (such as explained with respect to the example embodiment shown in FIG. 5D). Luminaires that continuously refine their luminaire position are generally referred to herein as "continuously learning luminaires." A continuously learning luminaire may use additional mobile computing device position information to more accurately determine luminaire position using statistical analysis. The learning process may begin when the luminaire receives several position estimates from the mobile computing devices passing through the field of view of the newly installed luminaire. One method for evaluating the accuracy of a luminaire position may involve using the standard deviation of the distance between data points and the geometric average of the population. This method may further include computing the center of all received position estimates. Alternative methods may include clustering received position estimates to reject non-plausible position information based on an expected range and/or weight criteria. Other forms of analysis may include, for example determining a running average. Although refining luminaire position based on received data may improve the precision of the navigation system, other techniques may be implemented to ensure the system operates as intended.

A confidence level, for example, may be used to determine whether to broadcast luminaire position to passing mobile computing devices, according to some embodiments. The confidence level is a value for tracking the received position information from passing mobile computing devices. The confidence level may be adjusted higher or lower in response to whether the received position information is within a desired tolerance range for a current luminaire position value. A luminaire may not begin broadcasting its position until the confidence level is equal to or above a threshold. The threshold can be any particular value or range of values that are sufficient to ensure proper operation of the navigation system. For example, the threshold may be set such that the luminaire broadcasts its position when at least 70% of the received position information is within one foot of the determined luminaire position. In some circumstances, a higher threshold may be desired, for example when the luminaire guides people out of the structure during an emergency. In other examples, the desired threshold may be lower, such as when a luminaire directs customers to a particular shopping display or product. Regardless of the threshold used by the luminaire, the confidence level is to have an initial value when deploying the luminaire.

The confidence level may have an initial value that prevents the newly installed luminaire from broadcasting an inaccurate luminaire position. The luminaire may initially have a default confidence level of zero. In this case, the luminaire is not broadcasting a luminaire position. As a result, a large number of received position data may be required before the luminaire may begin broadcasting its position. In other cases, however, the confidence level may be set above or below the threshold. For example, if the luminaire is not programmed with a luminaire position then the confidence level may have an initial value of below the threshold, but above zero. This confidence level may be desirable when the need for having an operational system outweighs the importance of having highly accurate luminaire position, for example when a luminaire is used for directing customers to a display. In this case the time required to begin broadcasting its position would be reduced because less data would be needed for the confidence level to achieve the threshold. In some embodiments, however, the luminaire may have an initial confidence level equal to or above the threshold. An example case would be when the luminaire is programmed with a luminaire position (e.g., an origin luminaire). The luminaire, in this example case, may broadcast its position immediately upon installation. No matter the initial value of the confidence level, the confidence level is compared with position information received from the mobile computing devices to determine the direction for adjusting the confidence level.

The direction for adjusting the confidence level may be either higher or lower. If the position information is within a specified tolerance limit (e.g., one foot from the luminaire position) then the confidence level may be adjusted higher. In contrast, if the position information is not within the tolerance limits, then the confidence level may remain the same or be lowered. This process may be repeated for position information received from other mobile computing devices. In other embodiments, the new position information data points may feed into a first-in-first-out (FIFO) buffer. Early inaccurate data may leave the FIFO buffer first and the confidence level is re-calculated using the latest data. No matter the method for adjusting the confidence level, when a sufficient number of position information data has been found to be within the tolerance limit, then the threshold is achieved. In response to achieving the threshold, the newly installed luminaire may then begin broadcasting its position information.

Adjusting the confidence level may also be based on the accuracy of the position information received from a mobile computing device. In one embodiment, the system may adjust the confidence level higher or lower in standard increments (e.g., 5 units). This method of adjusting the confidence level allows for ease of implementation and simplicity of design. With this approach, however, each input of position information carries the same contribution to the confidence value. That is, no weight to an input is applied based on the expected accuracy of the position information provided. Thus, position information received from computing devices having more recent technology will have the same weight as position information received from mobile computing devices that have been in service for several years and include less recent technology. To address these concerns, the confidence level may be adjusted based on the accuracy or expected accuracy of the position information received. In this case, the luminaire may evaluate the position information received from the mobile computing devices using a variety of factors, such as mobile computing device identification numbers and a mobile computing device confidence level for the received position information. Thus, if the luminaire receives position information from a current model year device, then the luminaire may give more weight to that position information when adjusting the confidence level (e.g., adjusting by 10 units instead of 5 units). Similarly, if the mobile computing device provides a quality indicator with the position information, the luminaire may take into account the quality of the position information when adjusting the confidence level. No matter the amount by which the confidence level is adjusted, the threshold and/or confidence level may need to be assessed over time to ensure proper operation of the navigation system.

When initially deploying luminaires in the array, an appropriate threshold may not be known. In this case, the luminaires may be installed using a default threshold. Overtime, however, the luminaires may be moved to different locations that require a different threshold (e.g., moving the luminaire from a display area to emergency access isle). In some cases, the environment in which the luminaire is deployed in may change, for example when a store is remodeled resulting in a different floor plan. For these situations, the threshold may need to be adjusted based on the change to the surrounding environment. In other cases, the confidence level may be re-evaluated based on the data received. Such is the case when the confidence level does not achieve the threshold, despite having a large amount of position data over a long period of operation. The luminaire may assess the confidence level by counting the number of position estimates within a specified radius (e.g., 10 meters) around the center of the position data. The specified radius defines an area where position data is likely to provide a confidence level equal to or above the threshold. If the position data indicates that the confidence level should be equal to or above the threshold, then the luminaire is receiving a large number of faulty or irrelevant position data. Based on this analysis, the confidence level may be raised to achieve the threshold. No matter how the threshold and confidence level are assessed, once the threshold has been achieved then the luminaire may lock/freeze its luminaire position.

With the threshold achieved, the newly installed luminaire may stop the learning process. In response, the luminaire may begin broadcasting consistent or constant position information. One method for providing a constant luminaire position is to lock or freeze the luminaire position of the newly installed luminaire. Locking or freezing position information may occur when the luminaire determines a steady state value for its position. A steady state value may be determined when, for example the confidence level no longer improves or changes significantly over a period of time (e.g., the FIFO buffer is full and the standard deviation does not decrease significantly anymore). Although broadcasting a consistent or constant luminaire position value provides expected results when navigating, this approach may not provide the most accurate information to mobile computing devices when compared to other embodiments that continuously evaluate the luminaire position.

In practice one may apply a confidence level with continuous learning techniques to one or more luminaires installed in the navigation array. When the navigation array is deployed having a combination of origin luminaires and continuously learning luminaires, the user of the mobile computing devices may initially rely on one or more origin luminaires to navigate through the structure or building. Over time, the continuously learning luminaires will learn their own positions as previously described. The continuously learning luminaires positioned near the origin luminaires may likely achieve an acceptable confidence level faster than other continuously learning luminaires that are positioned further away from the origin luminaires. The difference in time for achieving an acceptable confidence level may be caused by the inaccuracy of the estimated mobile computing device location data received by the distant continuously learning luminaires. Over time the average confidence level of the entire navigational array system may improve, until eventually all luminaires can be utilized for positioning service. The luminaires with usable position information may propagate like a wave starting from the origin luminaires to the last continuously learning luminaire of the navigation array.

Specific Applications

Other embodiments of the navigational array may include providing environment specific position information and presence detection with the structure.

One alternative embodiment of the array system may be for the luminaires to provide environment specific position information to the mobile computing device. Environment specific information may include for example, the presence of a doorway or a beginning of a hallway. The luminaires and/or servers may receive inertial information of the mobile computing device in addition to the estimated mobile device locations. This inertial information can be used to determine whether a user is traveling through a doorway or is at the beginning of a hallway. For example, a luminaire located in front of door way may receive inertial information from mobile computing devices that indicates that the user stops or slows down prior to entering the doorway within the field of view of the luminaire. Based on this information, the luminaire and/or server may conclude that the luminaire is position at a doorway. Then the luminaire may transmit a luminaire position that also identifies that a doorway may be adjacent to the luminaire's position.

In another embodiment of the array system the luminaire may also identify the presence of particular mobile computing devices within the structure. The array may include luminaires located near all the entrances and exits of the structure. As a person enters the structure, the mobile computing device may transmit unique information associated with the mobile computing device, for example, device model number, serial number, and/or telephone number. This information may be transmitted to the luminaire within the field of view of the mobile computing device or to a remote server through a local wireless radio connection, for example, Wi-Fi or Bluetooth, which allows access to a greater network such as the Internet or other wide area network. The navigational array system may identify whether a user of a mobile computing device has entered or left a particular room based on the unique information transmitted by the mobile computing device. Upon receipt of the identifying data, the navigation system may log that user within a database located in a server. When the mobile computing device exits the room, the navigation system may log the user out of the database. In other embodiments, this process may be applied to individual levels of a building, an entire building itself, or a group of buildings, such as a medical complex.

Further Considerations

Numerous embodiments will be apparent in light of this disclosure. One example embodiment provides a method of programming luminaire position into a luminaire, the method including providing a reference location of a origin luminaire to a mobile computing device, receiving position information from the mobile computing device, in which the position information is based on the reference location and an estimated displacement of the mobile computing device from the reference location, and determining the luminaire position of the luminaire using the position information from the mobile computing device. In some embodiments, the luminaire may be a LCom-enabled luminaire configured to receive the position information from the mobile computing device and determine the luminaire position, wherein the LCom-enabled luminaire is capable of transmitting a visible-light communication signal generated using a visible-light communication waveform. In some embodiments, a server may be configured to provide the reference location to the mobile computing device, receive position information from the mobile computing device, and determine the luminaire position of the luminaire. Some embodiments may further include broadcasting the luminaire position to the mobile computing device to provide navigation assistance to a user of the mobile computing device. In some embodiments, the luminaire position is broadcast when a confidence level is equal to or greater than a threshold, in which the confidence level is adjusted based on a comparison of received position information from at least one mobile computing device with the luminaire position. In some embodiments, the reference location may include at least one of an identifier of the origin luminaire and a location of the origin luminaire within an array of luminaires. In some embodiments, the estimated displacement of the mobile computing device may be a distance between a current location of the mobile computing device and the reference location. Some embodiments may further include receiving at least one additional position information from at least one additional mobile computing device, and statistically analyzing both the luminaire position and at least one additional position information from at least one additional mobile computing device. Some embodiments may further include re-determining the luminaire position for the luminaire based on the at least one additional position information from at least one additional mobile computing device.

Another example embodiment provides a non-transitory computer program product comprising a plurality of instructions non-transiently encoded thereon that, when executed by one or more processors, cause a process to be carried out. The computer program product may include one or more computer-readable mediums, such as, for example, a hard drive, compact disk, memory stick, server, cache memory, register memory, random-access memory (RAM), read-only memory (ROM), flash memory, or any suitable non-transitory memory that is encoded with instructions that can be executed by one or more processors, or a plurality or combination of such memories. The process includes providing a reference location of a first luminaire to a mobile computing device, receiving position information from the mobile computing device, in which the position information is based on the reference location and an estimated displacement of the mobile computing device from the reference location, and determining a luminaire position of a second luminaire using the position information from the mobile computing device. In some embodiments, the reference location may include at least one of an identifier of the first luminaire and a location of the first luminaire within an array of luminaires. Some embodiments may further include identifying the second luminaire proximate to the estimated displacement of the mobile computing device. In some embodiments, the luminaire position of the second luminaire may be determined using a look-up table and at least one of an identifier of the second luminaire and the estimated displacement of the mobile computing device, the look-up table including position and identifier information for a plurality of luminaires. In some embodiments, the look-up table maybe stored on a server communicatively coupled to the first luminaire, the second luminaire, and the mobile computing device.

Another example embodiment provides a system for programming luminaire position into a luminaire including: an array of luminaires that includes an first luminaire programmed with a position, in which the position is a reference location that is transmitted to a mobile computing device, and a second luminaire not programmed with a luminaire position, a transceiver configured for receiving position information from the mobile computing device, and a processor configured to use the received position information from the mobile computing device to determine the luminaire position of the second luminaire, and provide the determined luminaire position to the second luminaire via the transceiver. In some embodiments, the position information received from the mobile computing device may include the reference location and an estimated displacement of the mobile computing device from the first luminaire. In some embodiments, the processor may be disposed within the second luminaire. In some embodiments, the processor may be disposed within a server that is in communication with the array of luminaires via a network. In some embodiments, the server may be in communication with the second luminaire, such that the second luminaire indirectly receives the position information from the mobile computing device. In some embodiments, the second luminaire may be further configured to broadcast the luminaire position when a confidence level is equal to or greater than a threshold, in which the confidence level is adjusted based on a comparison of received position information from at least one mobile computing device with the luminaire position.

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the present disclosure, which is set forth in the following claims.

What is claimed is:

1. A method for programming luminaire position into a luminaire, the method comprising:
   providing a reference location of an origin luminaire to a mobile computing device;
   receiving position information from the mobile computing device, wherein the position information is based on the reference location and an estimated displacement of the mobile computing device from the reference location;
   adjusting a confidence level based on a comparison of the position information from the mobile computing device with a current luminaire position value;
   refining the current luminaire position value of the luminaire using the position information from the mobile computing device; and
   broadcasting the refined current luminaire position value from the luminaire when the confidence level is equal to or greater than a threshold.

2. The method of claim 1, wherein the luminaire is a LCom-enabled luminaire configured to receive the position information from the mobile computing device and refine the current luminaire position value, wherein the LCom-enabled luminaire is capable of transmitting a visible-light communication signal generated using a visible-light communication waveform.

3. The method of claim 1, wherein a server is configured to provide the reference location to the mobile computing device, receive the position information from the mobile computing device, and refine the current luminaire position value of the luminaire.

4. The method of claim 1, wherein the reference location includes at least one of an identifier of the origin luminaire and a location of the origin luminaire within an array of luminaires.

5. The method of claim 1, wherein the estimated displacement of the mobile computing device is a distance between a current location of the mobile computing device and the reference location.

6. The method of claim 1, the method further comprising locking the value of the current luminaire position value when the confidence level does not change significantly over a period of time.

7. The method of claim 1, wherein the confidence level is adjusted higher when the position information from the mobile computing device is within a tolerance range of the current luminaire position value and is adjusted lower or remains the same when the position information from the mobile computing device is outside of the tolerance range.

8. The method of claim 1, wherein the confidence level is calculated using a first-in-first-out buffer that stores the most recent position information received from one or more mobile computing devices.

9. The method of claim 1, wherein the confidence level is further adjusted based on at least one of an identifier of the mobile computing device and a quality indicator associated with the position information received from the mobile computing device.

10. The method of claim 1, wherein an initial value of the confidence level is set below the threshold when the luminaire is not programmed with an initial current luminaire position value and is set at or above the threshold when the luminaire is programmed with an initial current luminaire position value.

11. A non-transitory computer program product comprising a plurality of instructions encoded thereon that when executed by one or more processors cause a process to be carried out, the process comprising:
   providing a reference location of a first luminaire to a mobile computing device;
   receiving position information from the mobile computing device, wherein the position information is based on the reference location and an estimated displacement of the mobile computing device from the reference location;
   adjusting a confidence level based on a comparison of the position information from the mobile computing device with a current luminaire position value;

refining a current luminaire position value of a second luminaire using the position information from the mobile computing device; and, broadcasting the refined current luminaire position value from the second luminaire when the confidence level is equal to or greater than a threshold.

12. The computer program product of claim 11, wherein the reference location includes at least one of an identifier of the first luminaire and a location of the first luminaire within an array of luminaires.

13. The computer program product of claim 11, the process further comprising identifying the second luminaire proximate to the estimated displacement of the mobile computing device.

14. The computer program product of claim 13, wherein the current luminaire position value of the second luminaire is determined using a look-up table and at least one of an identifier of the second luminaire and the estimated displacement of the mobile computing device, the look-up table comprising position and identifier information for a plurality of luminaires.

15. The computer program product of claim 14, wherein the look-up table is stored on a server communicatively coupled to the first luminaire, the second luminaire, and the mobile computing device.

16. A system for programming luminaire position into a luminaire, the system comprising:

an array of luminaires comprising:

an first luminaire programmed with a position, wherein the position is a reference location that is transmitted to a mobile computing device;

a second luminaire storing a current luminaire position value;

a transceiver configured for receiving position information from the mobile computing device; and a processor configured to:

adjusting a confidence level based on a comparison of the position information from the mobile computing device with the current luminaire position value;

use the received position information from the mobile computing device to refine the current luminaire position value of the second luminaire; and provide the refined luminaire position value to the second luminaire via the transceiver, wherein the second luminaire is further configured to broadcast the refined current luminaire position value when the confidence level is equal to or greater than a threshold.

17. The system of claim 16, wherein the position information received from the mobile computing device comprises the reference location and an estimated displacement of the mobile computing device from the first luminaire.

18. The system of claim 16, wherein the processor is disposed within the second luminaire.

19. The system of claim 16, wherein the processor is disposed within a server that is in communication with the array of luminaires via a network.

20. The system of claim 19, wherein the server is in communication with the second luminaire, such that the second luminaire indirectly receives the position information from the mobile computing device.

* * * * *